United States Patent
Ichikawa

(10) Patent No.: US 8,184,376 B2
(45) Date of Patent: May 22, 2012

(54) THREE UNIT ZOOM LENS AND IMAGE PICKUP APPARATUS EQUIPPED WITH SAME

(75) Inventor: Keisuke Ichikawa, Tama (JP)

(73) Assignee: Olympus Imaging Corp., Tokyo (JP)

( * ) Notice: Subject to any disclaimer, the term of this patent is extended or adjusted under 35 U.S.C. 154(b) by 701 days.

(21) Appl. No.: 12/384,405

(22) Filed: Apr. 3, 2009

(65) Prior Publication Data

US 2009/0284843 A1    Nov. 19, 2009

(30) Foreign Application Priority Data

Apr. 8, 2008   (JP) ................................ 2008-100404
Apr. 8, 2008   (JP) ................................ 2008-100449

(51) Int. Cl.
*G02B 15/14*    (2006.01)
(52) U.S. Cl. ........................ 359/682; 359/689
(58) Field of Classification Search .................. 359/680, 359/681, 682, 689
See application file for complete search history.

(56) References Cited

U.S. PATENT DOCUMENTS

| | | | |
|---|---|---|---|
| 6,903,878 B2 | 6/2005 | Nanba | |
| 7,224,498 B2 * | 5/2007 | Tochigi | 358/474 |
| 7,388,716 B2 | 6/2008 | Yamaguchi et al. | |
| 2002/0191306 A1 * | 12/2002 | Toyama | 359/689 |
| 2007/0121218 A1 | 5/2007 | Yamaguchi et al. | |

FOREIGN PATENT DOCUMENTS

| | | |
|---|---|---|
| CN | 1 402 037 | 3/2003 |
| JP | 2006-195064 | 7/2006 |
| JP | 2007-148052 | 6/2007 |

* cited by examiner

*Primary Examiner* — Scott J Sugarman
(74) *Attorney, Agent, or Firm* — Kenyon & Kenyon LLP

(57) ABSTRACT

A zoom lens includes, in order from the object side, a negative lens unit, a positive lens unit and a positive lens unit. During zooming from the object side, the second lens unit moves, the distance between the first lens unit and the second lens unit decreases, the distance between the second lens unit and the third lens unit increases. The second lens unit has two lens components including, in order from the object side, a positive front lens component and a rear lens component. The third lens unit is composes of two lens components including, in order from the object side, a front lens component and a positive rear lens component. An aperture stop is disposed closer to the image side than the first lens unit and closer to the object side than the rear lens component in the second lens unit, and the aperture stop moves integrally with the second lens unit along the optical axis direction during zooming from the wide angle end to the telephoto end.

54 Claims, 21 Drawing Sheets

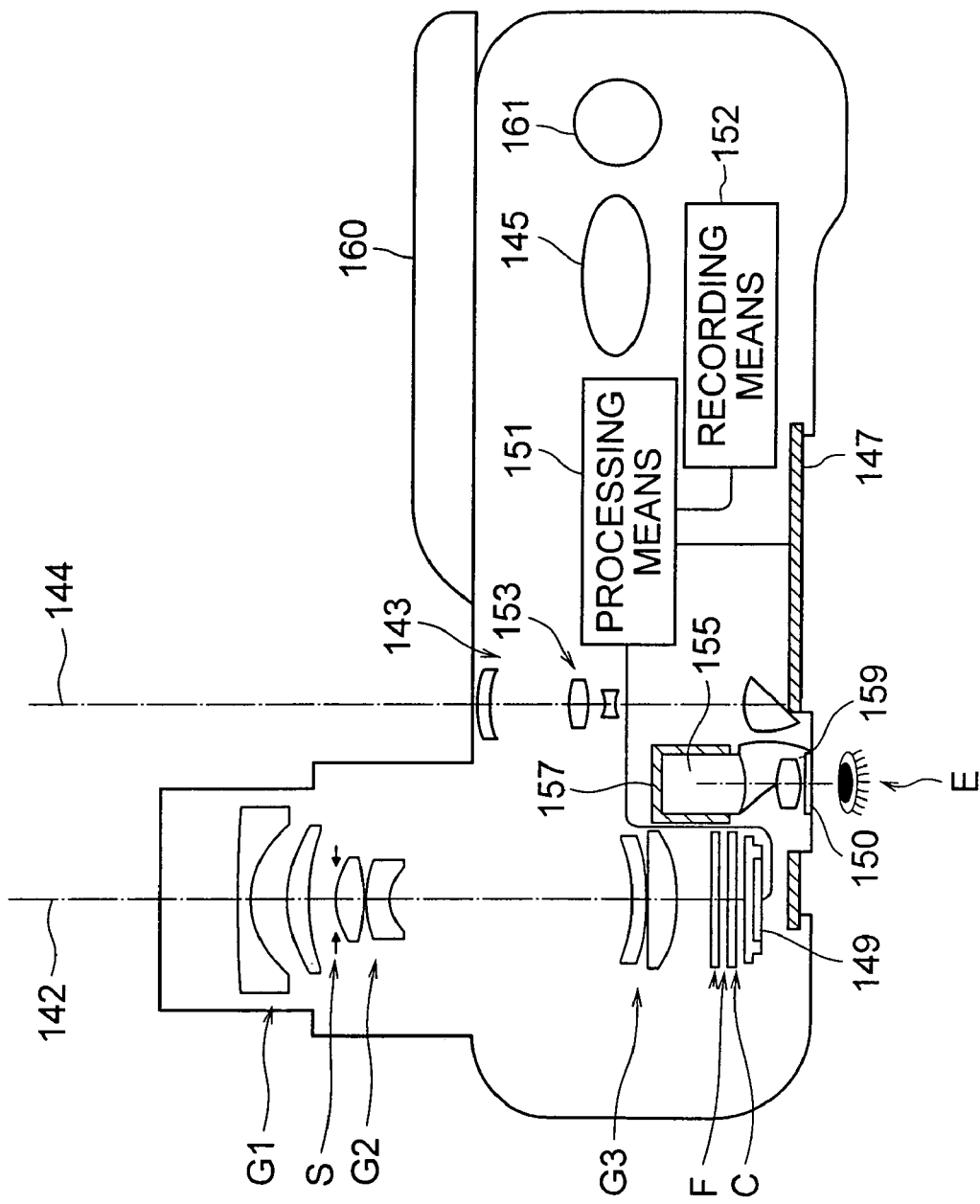

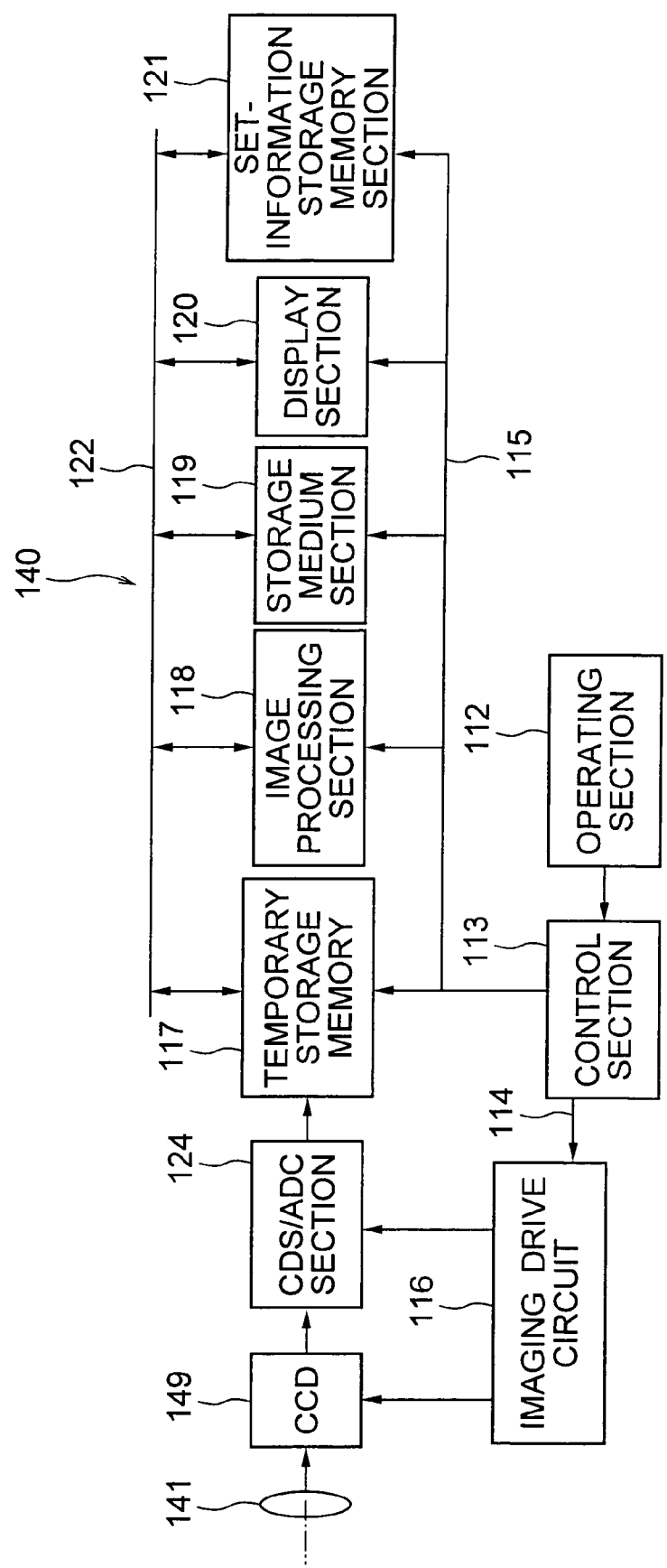

THREE UNIT ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application Nos. 2008-100404 filed on Apr. 8, 2008 and 2008-100449 filed on Apr. 8, 2008; the entire contents of which are incorporated herein by reference.

BACKGROUND OF THE INVENTION

1. Field of the Invention

The present invention relates to a three unit zoom lens including, in order from the object side thereof, a first lens unit having a negative refracting power, a second lens unit having a positive refracting power, and a third lens unit having a positive refracting power. The present invention also relates to an image pickup apparatus equipped with such a three unit zoom lens.

2. Description of the Related Art

In recent years, digital cameras that pick up an image of an object using an image pickup element such as a CCD or CMOS sensor have replaced film cameras to become the mainstream. Furthermore, various categories of digital cameras ranging from popular-priced compact type cameras to advanced type cameras for professionals have been developed.

Users of such popular-priced digital cameras generally wish to enjoy easy and simple shooting in various shooting situations anywhere at any time. For this reason, such users favor small size digital cameras, especially cameras that are small with respect to the thickness direction and can be conveniently carried in a pocket of clothes or a bag. Therefore, a further reduction in the size of the taking lens system is demanded. In addition wider angles of field are desired to extend the shooting scenes. Therefore, there is a demand for a zoom lens having a high zoom ratio, a wide angle of field at the wide angle end of its zoom range, and good optical performance.

A three unit zoom lens including, in order from the object side thereof, a first lens unit having negative refracting power, a second lens unit having a positive refracting power, and a third lens unit having a positive refracting power is well known as a zoom lens that can be made small in the collapsed state and easily designed to have a high zoom ratio.

Japanese Patent Application Laid-Open Nos. 2006-195064 and 2007-148052 disclose three unit zoom lenses of this type, in which each lens unit is composed of a plurality of lens components to achieve good optical performance.

SUMMARY OF THE INVENTION

A three unit zoom lens according to a first aspect of the present invention comprises, in order from its object side:
a first lens unit having a negative refracting power;
a second lens unit having a positive refracting power; and
a third lens unit having a positive refracting power, wherein
during zooming from the wide angle end to the telephoto end, the second lens unit moves, the distance between the first lens unit and the second lens unit decreases, and the distance between the second lens unit and the third lens unit increases,
when a lens component is defined as a lens member whose surfaces that are in contact with air on an optical axis include only two surfaces, one being an object side surface and the other being an image side surface,
the second lens unit comprises, in order from the object side, a front lens component having an object side lens surface convex toward the object side and having a positive refracting power and a rear lens component having an image side lens surface concave toward the image side, the total number of lens components included in the second lens unit is two,
the third lens unit comprises, in order from the object side, a front lens component having an object side lens surface concave toward the object side and a rear lens component having a image side lens surface convex toward the image side and having a positive refracting power, and the total number of lens components included in the third lens unit is two, and the three unit zoom lens comprises an aperture stop disposed closer to the image side than the first lens unit and closer to the object side than the rear lens component in the second lens unit, and the aperture stop moves integrally with the second lens unit along the optical axis direction during zooming from the wide angle end to the telephoto end.

A three unit zoom lens according to a second aspect of the present invention comprises, in order from its object side:
a first lens unit having a negative refracting power;
a second lens unit having a positive refracting power; and
a third lens unit having a positive refracting power, wherein
during zooming from the wide angle end to the telephoto end, the second lens unit moves, a distance between the first lens unit and the second lens unit decreases, and a distance between the second lens unit and the third lens unit increases,
when a lens component is defined as a lens member whose surfaces that are in contact with air on the optical axis include only two surfaces, one being an object side surface and the other being an image side surface, the first lens unit comprises, in order from the object side, a front lens component having an object side lens surface concave toward the object side and having a negative refracting power and a rear lens component having a positive refracting power, the total number of lens components included in the first lens unit is two, the second lens unit comprises, in order from the object side, a front lens component having a positive refracting power and a rear lens component having an image side lens surface concave toward the image side and having a negative refracting power, the total number of lens components included in the second lens unit is two, and the third lens unit comprises two lens components including, in order from the object side a front lens component having an object side lens surface concave toward the object side and a rear lens component having a positive refracting power, and
the zoom lens comprises an aperture stop disposed closer to the image side than the first lens unit and closer to the object side than the rear lens component in the second lens unit, and the aperture stop moves integrally with the second lens unit along the optical axis direction during zooming from the wide angle end to the telephoto end.

An image pickup apparatus according to a third aspect of the present invention comprises:
a three unit zoom lens as described above; and
an image pickup element having an image pickup surface disposed on the image side of the three unit zoom lens that converts an image formed on the image pickup surface by the three unit zoom lens into an electrical signal.

BRIEF DESCRIPTION OF THE DRAWINGS

FIGS. 16A, 163, and 16C are diagram similar to FIGS. 9A, 9B, and 9C showing aberrations of the zoom lens according to the eighth embodiment in the state in which the zoom lens is focused on an object point at infinity;

FIG. 20 is a cross sectional view of the digital camera; and

FIG. 21 is a block diagram of an internal circuit of a principal portion of the digital camera.

DETAILED DESCRIPTION OF THE INVENTION

Figure 1A:
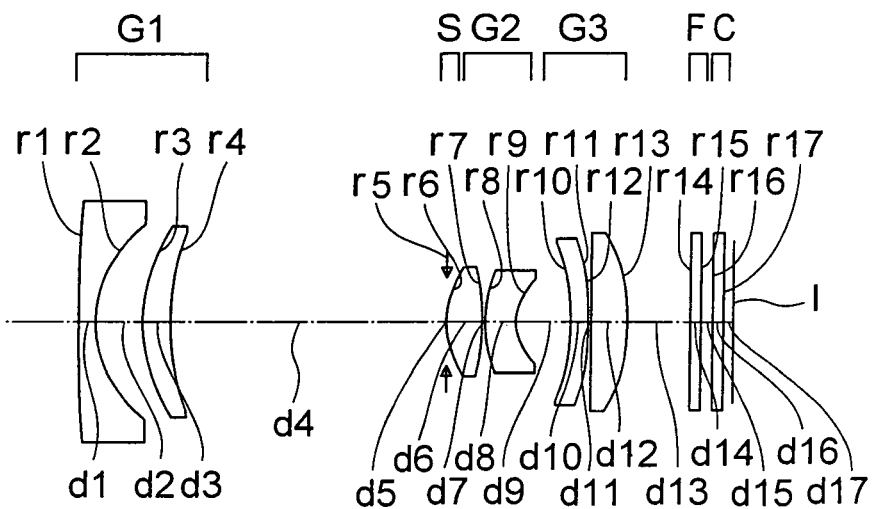
FIGS. 1A, 1B, and 1C are cross sectional views along the optical axis of a zoom lens according to a first embodiment of the present invention in the state in which the zoom lens is focused on a object point at infinity respectively at the wide angle end (FIG. 1A), in an intermediate state (FIG. 1B), and at the telephoto end (FIG. 1C)

A three unit zoom lens according to the first aspect of the present invention includes, in order from the object side thereof, a first lens unit having a negative refracting power, a second lens unit having a positive refracting power, and a third lens unit having a positive refracting power, wherein during zooming from the wide angle end to the telephoto end, the second lens unit moves, the distance between the first lens unit and the second lens unit decreases, and the distance between the second lens unit and the third lens unit increases, when a lens component is defined as a lens member whose surfaces that are in contact with air on the optical axis include only two surfaces, one being the object side surface and the other being the image side surface, the second lens unit has two lens components including, in order from the object side, a front lens component having an object side lens surface convex toward the object side and having a positive refracting power and a rear lens component having an image side lens surface concave toward the image side, the third lens unit has two lens components including, in order from the object side, a front lens component having an object side lens surface concave toward the object side and a rear lens component having an image side lens surface convex toward the image side and having a positive refracting power, and the zoom lens further includes an aperture stop disposed closer to the image side than the first lens unit and closer to the object side than the rear lens component in the second lens unit, and during zooming from the wide angle end to the telephoto end, the aperture stop moves integrally with the second lens unit along the optical axis direction.

In the three unit zoom lens according to the present invention, a negative-positive-positive refracting power arrangement is adopted. This power arrangement type is advantageous in achieving an adequately wide angle of field at the wide angle end and in making the diametrical size of the first lens unit small. In addition, since the number of lens units is small, this type is advantageous also in making the size of the zoom lens in the collapsed state small and in making the mechanism for driving the lens units simple.

With the above described relationship among the lens units during zooming, the second lens unit is designed to provide a major part of the magnification change.

According to the above described basic configuration of the three unit zoom lens according to the first aspect of the present invention, the second lens unit and the third lens unit are each composed of two lens components, whereby the configuration of the second and the third lens unit is made simple.

In addition, the two lens components in the second lens unit include a front lens component having an object side surface convex toward the object side and having a positive refracting power and a rear lens component having an image side surface concave toward the image side. This configuration facilitates locating a principal point of the second lens unit closer to the object side, which is advantageous in providing a magnification change by changing the distance between the first lens unit and the second lens unit.

Furthermore, the concave shape of the image side lens surface is contributive to correction of aberrations generated in the second lens unit and, at the same time, advantageous in reducing the size of the second lens unit with respect to the diametrical direction and in maintaining an adequately high image height by refracting off-axis beams to directions away from the optical axis.

The two lens components in the third lens unit include a front lens component having an object side surface concave toward the object side and a rear lens component having an image side surface convex toward the image side and having a positive refracting power. With this configuration, it is possible to make the angle of incidence of off-axis beams on the third lens unit small while maintaining the positive refracting power of the third lens unit. This is advantageous in reducing off-axis aberrations.

At zoom positions near the wide angle end, a composite system of the second lens unit and the third lens unit plays a role similar to the rear lens group in a retro-focus type lens. Therefore it is important, in order to achieve good optical performance, to reduce aberrations in this composite system.

In the three unit zoom lens according to the first aspect of the present invention, the surface of the second lens unit and the surface of the third lens unit that face each other are concave surfaces, the front lens component in the second lens unit has a convex surface directed toward the object side and has a positive refracting power, and the image side lens component in the third lens unit has a convex surface directed toward the image side and has a positive refracting power. By this design, a symmetrical lens component arrangement like a Gauss type is achieved. This facilitates correction of aberrations such as spherical aberration and curvature of field. Consequently, this design facilitates a reduction of aberrations that tend to be generated when the zoom lens is designed to have a high speed, a wide angle of field, and a high zoom ratio.

The position of the aperture stop is important in determining the positions through which beams pass in the respective lens units. According to the first aspect of the present invention, by disposing the aperture stop at the above described position, the size of the first lens unit with respect to the diametrical direction can easily be made small even if the angle of field is increased. This is also advantageous in correcting aberrations.

Moving the aperture stop and the second lens unit integrally facilitates a simplification of the driving mechanism. In addition, the effective diameter of the second lens unit can be made small at both the wide angle end and the telephoto end, which is advantageous in making the size of the second lens unit small and in reducing aberrations.

In the zoom lens according to the present invention, it is more preferred that one or some of the following features be additionally adopted.

It is preferred that the second lens unit and the third lens unit satisfy the following conditions:

$$2<(R_{2F}+R_{2R})/(R_{2F}-R_{2R})<20 \quad (1)$$

$$1<(R_{3F}+R_{3R})/(R_{3F}-R_{3R})<12 \quad (2)$$

where, $R_{2F}$ is the paraxial radius of curvature of the lens surface closest to the object side in the second lens unit, $R_{2R}$ is the paraxial radius of curvature of the lens surface closest to the image side in the second lens unit, $R_{3F}$ is the paraxial radius of curvature of the lens surface closest to the object side in the third lens unit, and $R_{3R}$ is the paraxial radius of curvature of the lens surface closest to the image side in the third lens unit.

Conditional expressions (1) specifies more preferred shapes of the lens surface closest to the object side and the lens surface closest to the image side in the second lens unit. Conditional expressions (2) specifies more preferred shapes of the lens surface closest to the object side and the lens surface closest to the image side in the third lens unit.

If conditional expressions (1) and (2) are satisfied at the same time, a reduction in the Petzval sum and coma etc. can be achieved by cancellation of their factors. Therefore, satisfying these conditional expressions provides a further advantage in the performance of the zoom lens when the angle of field is increased.

If the upper limit of conditional expression (1) is not exceeded, an increase in negative spherical aberration and an increase in the Petzval sum in the negative direction can easily be prevented, and a reduction in coma is facilitated. If the lower limit of conditional expression (1) is not exceeded, an increase in positive spherical aberration and an increase in the Petzval sum in the positive direction can easily be prevented, and a reduction in coma is facilitated.

If the upper limit of conditional expression (2) is not exceeded, an increase in negative spherical aberration and an increase in the Petzval sum in the negative direction can easily be prevented. If the lower limit of conditional expression (2) is not exceeded, an increase in positive spherical aberration and an increase in the Petzval sum in the positive direction can easily be prevented. In addition, undercorrection of chromatic aberration of magnification can easily be prevented.

It is also preferred that the object side surface of the rear lens component in the second lens unit be convex toward the object side, and the image side lens surface of the front lens component in the third lens unit be convex toward the image side.

By this lens surface design, the positive refracting power of the second lens unit can be shared by a plurality of lens surfaces, which is advantageous in reducing aberrations and in achieving an adequate zoom ratio.

Furthermore, this lens surface design facilitates a reduction in the absolute value of the refracting power of the front lens component in the third lens unit, and more effective reduction of variations in aberration during zooming can readily be provided by this lens component.

Still further, this lens surface design further improves the degree of symmetry of the composite system of the second lens unit and the third lens unit, which is advantageous in reducing various aberrations.

It is also preferred that the rear lens component in the second lens unit have a negative refracting power.

This makes the position of a principal point of the second lens unit closer to the object side, which is advantageous in achieving a high zoom ratio and in reducing chromatic aberration generated in the second lens unit.

It is also preferred that the second lens unit and the third lens unit satisfy the following condition:

$$-0.9<(R_{2R}+R_{3F})/(R_{2R}-R_{3F})<0.0 \quad (A)$$

where, $R_{2R}$ is the paraxial radius of curvature of the lens surface closest to the image side in the second lens unit, and $R_{3F}$ is the paraxial radius of curvature of the lens surface closest to the object side in the third lens unit.

Conditional expression (A) specifies preferred shapes of the air lens formed between the second lens unit and the third lens unit. If the lower limit of conditional expression (A) is not exceeded so that the object side lens surface of the third lens unit has an adequate curvature, the composite system of the second lens unit and the third lens unit can have an adequate aberration correction function, and correction of curvature of field is facilitated. If the upper limit of conditional expression (A) is not exceeded so that the absolute value of the curvature of the object side lens surface of the third lens unit is prevented from becoming unduly large, the angle of incidence of off-axis beams on the third lens unit at zoom positions near the telephoto angle end can be made small, which facilitates a reduction in variations in off-axis aberrations.

It is also preferred that the front lens component in the third lens unit have a meniscus shape, the absolute value of the paraxial radius of curvature of the image side lens surface of the rear lens component in the third lens unit be smaller than the absolute value of the paraxial radius of curvature of the object side lens surface thereof, and the following condition be satisfied:

$$-15 < (R_{3FR} + R_{3RF})/(R_{3FR} - R_{3RF}) < 0.0 \quad (B)$$

$$0 < (R_{3RF} + R_{3R})/(R_{3RF} - R_{3R}) < 3 \quad (C)$$

where, $R_{3FR}$ is the paraxial radius of curvature of the image side lens surface of the front lens component in the third lens unit, $R_{3RF}$ is the paraxial radius of curvature of the object side lens surface of the rear lens component in the third lens unit, and $R_{3R}$ is the paraxial radius of curvature of the lens surface closest to the image side in the third lens unit.

The above described features provide advantages in reducing variations of curvature of field and in increasing the angle of field. Conditional expression (B) specifies preferred shapes of the air lens in the third lens unit, and conditional expression (C) specifies preferred shapes of the rear lens component in the third lens unit.

Conditional expressions (B) and (C) describe more preferred conditions for facilitating a reduction in aberrations when the angle of field of the zoom lens is increased. If the lower limit of conditional expression (B) is not exceeded so that the difference in the curvature of both side surfaces that define the air lens becomes adequately large, the third lens unit can be provided with an appropriate positive refracting power, and the front lens component in the third lens unit can have an appropriate aberration correction function, advantageously. If the upper limit of conditional expression (B) is not exceeded, a reduction in the angle of incidence of off-axis beams on the rear lens component in the third lens unit is facilitated, which is advantageous in reducing aberrations when the angle of field of the zoom lens is increased.

If the lower limit of conditional expression (C) is not exceeded so that the curvature of the object side lens surface of the rear lens component in the third lens unit is made small, a reduction in aberrations generated by this surface is facilitated. If the upper limit of conditional expression (C) is not exceeded so that the curvatures of the object side lens surface and the image side lens surface of the rear lens component in the third lens unit are made small, reduction in coma etc. is facilitated.

It is also preferred that the front lens component in the third lens unit have a meniscus shape that satisfies the following condition:

$$-0.5 > f_{3FF}/f_{3FR} > -1.2 \quad (6)$$

where $f_{3FF}$ is the inverse of the refracting power of the object side lens surface of the front lens component in the third lens unit, and $f_{3FR}$ is the inverse of the refracting power of the image side lens surface of the front lens component in the third lens unit.

Designing the front lens component in the third lens unit to have a meniscus shape facilitates correction of negative curvature of field that is generated by the second lens unit throughout the entire zoom range. This leads to a decrease in the share of correction of curvature of field that the first lens unit is required to provide. Therefore, optimization of the refracting powers of the respective lens units can be facilitated, and generation of aberrations associated with an increase in the angle of field and an increase in the zoom ratio can easily be made smaller.

During zooming from the wide angle end to the telephoto end, the angle of incidence of off-axis beams on the object side lens surface of the front lens component in the third lens unit changes. Therefore, the difference between the optical path length at the wide angle end and that at the telephoto end becomes large, and variations in higher order curvature of field in the peripheral region caused by zooming can be made small.

Conditional expression (6) specifies refracting powers that are preferred in achieving correction of curvature of field. If the lower limit of conditional expression (6) is not exceeded, curvature of field and astigmatic difference can easily be prevented from becoming unduly large. If the upper limit of conditional expression (6) is not exceeded, an adequate effect in correcting curvature of field is provided, and the share of aberration correction that the first lens unit is required to provide can be made smaller. This is advantageous in achieving a higher zoom ratio by appropriate power arrangement.

It is preferred that the first lens unit have a negative lens component having an image side lens surface concave toward the image side and having a negative refracting power, and a positive lens component having a positive refracting power disposed on the image side of the negative lens component and having an object side lens surface convex toward the object side, and the object side lens surface of the positive lens component have a paraxial radius of curvature that is larger than the paraxial radius of curvature of the image side lens surface of the negative lens component.

If the above-described preferred feature is adopted, the position of a principal point of the first lens unit is made closer to the object side, which is advantageous in reducing the size of the first lens unit with respect to the diametrical direction. In addition, if the above feature is adopted, it is easy to make the angle of incidence of beams on the image side lens surface of the negative lens component and the object side lens surface of the positive lens component moderately small while providing these lens components with appropriate refracting powers. This is advantageous in reducing chromatic aberration, curvature of field, and off-axis aberrations particularly at zoom positions near the wide angle end.

It is also preferred that the aperture stop be disposed just in front of the front lens component in the second lens unit. This facilitates a further reduction in the size of the first lens unit. In addition, this also facilitates providing the image side lens surface of the second lens unit with a function of refracting beams in directions away from the optical axis. Furthermore this also facilitates a reduction in the angle of incidence of off-axis beams on the image plane.

A three unit zoom lens according to the second aspect of the present invention includes, in order from the object side thereof, a first lens unit having a negative refracting power, a second lens unit having a positive refracting power, and a third lens unit having a positive refracting power, wherein during zooming from the wide angle end to the telephoto end, the second lens unit moves, the distance between the first lens unit and the second lens unit decreases, and the distance between the second lens unit and the third lens unit increases, when a lens component is defined as a lens member whose surfaces that are in contact with air on the optical axis include only two surfaces, one being the object side surface and the other being the image side surface, the first lens unit has two lens components including, in order from the object side, a front lens component having an object side lens surface concave toward the object side and having a negative refracting power and a rear lens component having a positive refracting power, the second lens unit has two lens components including, in order from the object side, a front lens component having a positive refracting power and a rear lens component having an image side lens surface concave toward the image side and having a negative refracting power, and the third lens unit has two lens components including, in order from the object side, a front lens component having an object side lens surface concave toward the object side and a rear lens component having a positive refracting power, and the zoom lens further includes an aperture stop disposed closer to the image side than the first lens unit and closer to the object side than the rear lens component in the second lens unit, and during zooming from the wide angle end to the telephoto end, the aperture stop moves integrally with the second lens unit along the optical axis direction.

In the three unit zoom lens according to the present invention, a negative-positive-positive refracting power arrangement is adopted. This power arrangement type is advantageous in achieving an adequately wide angle of field at the wide angle end and in making the diametrical size of the first lens unit small. In addition, since the number of lens units is small, this type is advantageous also in making the size of the zoom lens in the collapsed state small, and in making the mechanism for driving the lens units simple.

With the above described relationship among the lens units during zooming, the second lens unit is designed to provide a major part of the magnification change.

According to the above described basic configuration of the three unit zoom lens according to the present invention, the first lens unit, the second lens unit, and the third lens unit are each composed of two lens components, whereby both aberration correction in each lens unit and simplification of the configuration are achieved.

The two lens components in the first lens unit include a front lens component having an object side lens surface concave toward the object side and having a negative refracting power and a rear lens component having a positive refracting power.

This configuration of the first lens unit is advantageous in locating an principal point of the first lens unit closer to the object side and in reducing the size of the first lens unit with respect to the diametrical direction. In addition, correction of chromatic aberration and curvature of field is facilitated.

Furthermore, according to the present invention, the lens surface closest to the object side in the first lens unit is concave at least in the vicinity of the optical axis.

Thus, this concave surface also shares the negative refracting power of the first lens unit, which facilitates a reduction in spherical aberration at zoom positions near the telephoto end at which the diameter of on-axis beams tends to be large, and has advantages in achieving an adequate lens speed and in increasing the zoom ratio.

The two lens components in the second lens unit include a front lens component having a positive refracting power and a rear lens component having an image side lens surface concave toward the image side and having a negative refracting power.

This configuration of the second lens unit facilitates locating a principal point of the second lens unit closer to the object side, which is advantageous in providing a magnification change by changing the distance between the first lens unit and the second lens unit. Furthermore, the concave shape of the image side lens surface is contributive to correction of aberrations generated in the second lens unit and, at the same time, advantageous in reducing the size of the second lens unit with respect to the diametrical direction and in maintaining an adequately high image height by refracting off-axis beams to directions away from the optical axis.

The two lens components in the third lens unit include a front lens component having an object side surface concave toward the object side and a rear lens component having a positive refracting power. With this configuration of the third lens unit, it is possible to make the angle of incidence of off-axis beams on the third lens unit small while maintaining an appropriate positive refracting power of the third lens unit. This is advantageous in reducing off-axis aberrations.

When the zoom ratio of a zoom lens is high, a change in the diameter of beams incident on the third lens unit caused by zooming tends to be large. By the above described configuration of the third lens unit, changes in the angle of incidence of beams on the third lens unit can be made small, which facilitates a reduction in variations of aberrations during zooming.

At zoom positions near the telephoto end, since the first lens unit and the second lens unit come close to each other. In view of this, in order to achieve an adequate lens speed and an adequate zoom ratio, it is important to reduce spherical aberration etc. in the composite system of the first lens unit and the second lens unit.

In the three unit zoom lens according to the second aspect of the present invention, this composite system includes, in order from the object side, a negative lens component, a positive lens component, a positive lens component, and a negative lens component, and the object side lens surface and the image side lens surface of the composite system are concave surfaces each having a negative refracting power. This symmetrical arrangement is advantageous in reducing aberrations such as spherical aberration and curvature of field at the telephoto end.

At the wide angle end also, the lens surface of the second lens unit and the lens surface of the third lens unit that face each other are concave surfaces, and the object side lens component and the image side lens component of the composite system of the second and the third lens units each have a positive refracting power. This symmetrical refracting power arrangement is advantageous in reducing aberrations such as curvature of field.

The position of the aperture stop is important in determining the positions through which beams pass in the respective lens units. According the second aspect of the present invention, by disposing the aperture stop at the above described position, the size of the first lens unit with respect to the diametrical direction can easily be made small even if the angle of field is increased. This is also advantageous in correcting aberrations.

Moving the aperture stop and the second lens unit integrally facilitates a simplification of the driving mechanism. In addition, the effective diameter of the second lens unit can be made small at both the wide angle end and the telephoto end, which is advantageous in making the size of the second lens unit small and in reducing aberrations.

In the zoom lens according to the second aspect of the present invention, it is more preferred that one or some of the following features be additionally adopted.

It is preferred that the first lens unit and the second lens unit satisfy the following condition:

$$0.1 < (R_{1F} + R_{2R})/(R_{1F} + R_{2R}) < 1 \tag{3}$$

where, $R_{1F}$ is the paraxial radius of curvature of the lens surface closest to the object side in the first lens unit, and $R_{2R}$ is the paraxial radius of curvature of the lens surface closest to the image side in the second lens unit.

Conditional expression (3) specifies more preferred shapes of the lens surface closest to the object side in the first lens unit and the lens surface closest to the image side in the second lens unit.

Making the negative refracting power of the lens surface closest to the object side in the first lens unit moderately small facilitates a reduction in aberrations such as coma and distortion at zoom positions near the wide angle end.

If the lower limit of conditional expression (3) is not exceeded so that the paraxial radius of curvature of the lens surface closest to the object side is made moderately small, generation of unduly large distortion at zoom positions near the wide angle end can easily be prevented.

If the upper limit of conditional expression (3) is not exceeded so that the lens surface closest to the object side has an adequate negative refracting power, a reduction in the Petzval sum and spherical aberration is facilitated.

It is preferred that the front lens component in the first lens unit be a biconcave lens component that satisfy the following condition:

$$-0.5<(R_{1F}+R_{1FR})/(R_{1F}-R_{1FR})<1.0 \quad (D)$$

where, $R_{1F}$ is the paraxial radius of curvature of the lens surface closest to the object side in the first lens unit, and $R_{1FR}$ is the paraxial radius of curvature of the image side lens surface of the front side lens component in the first lens unit.

If the front lens component in the first lens unit has a biconcave shape, a negative refracting power can be shared by a plurality of lens surfaces, which is advantageous in reducing the spherical aberration generated in the first lens unit.

Conditional expression (D) specifies preferred shapes of the lens component taking into account influence on off-axis aberrations.

If the lower limit of conditional expression (D) is not exceeded, the image side lens surface of this lens component has an adequate negative refracting power, and a reduction in spherical aberration is facilitated. Furthermore, a reduction in the absolute value of the curvature of the object side lens surface is also facilitated, which is advantageous in correcting coma etc. at zoom positions near the wide angle end. If the upper limit of conditional expression (D) is not exceeded so that the object side lens surface has an adequate negative refracting power, a reduction in spherical aberrations etc. is facilitated.

It is also preferred that the front lens component and the rear lens component in the first lens unit satisfy the following condition:

$$-1.8<f_{1F}/f_W<-1 \quad (7)$$

$$2<f_{1R}/f_W<9 \quad (8)$$

where $f_{1F}$ is the focal length of the front lens component in the first lens unit, $f_{1R}$ is the focal length of the rear lens component in the first lens unit, and $f_W$ is the focal length of the entire three unit zoom lens system at the wide angle end.

Conditional expressions (7) and (8) describe optimum relationship of the focal lengths of the lens components included in the first lens unit that ensures satisfactory performance even if the zoom ratio is made as high as approximately four.

If the lower limit of conditional expression (7) is not exceeded, generation of high-order spherical aberration will be suppressed, whereby correction of spherical aberration is facilitated throughout the entire zoom range.

If the upper limit of conditional expression (7) is not exceeded, variations of spherical aberration and curvature of field during zooming can easily be made small. This is advantageous in achieving good performance throughout the entire zoom range.

If the lower limit of conditional expression (8) is not exceeded so that the positive refracting power is made moderately small, suppression of positive curvature of field is facilitated. If the upper limit of conditional expression (8) is not exceeded so that the positive refracting power is made moderately large, suppression of negative curvature of field is facilitated.

It is preferred that the object side surface of the front lens component in the first lens unit be an aspheric surface having a negative refracting power that decreases away from the optical axis.

The effective diameter of the lens surface closest to the object side is larger at the wide angle end than at the telephoto end. Therefore, designing this lens surface to have the above described aspheric shape is advantageous not only in reducing high-order spherical aberration at zoom positions near the telephoto end but also in reducing coma etc. at zoom positions near the wide angle end.

Furthermore, if the shape of this aspheric surface is designed in such a way that the negative refracting power thereof decreases away from the optical axis and eventually becomes positive, correction of off-axis aberrations will be further facilitated.

Furthermore, it is preferred that the front lens component in the first lens unit have a biconcave shape, and the rear lens component in the first lens unit have a meniscus shape that is convex toward the object side.

If these lens components have the above described shapes, a negative refracting power can be shared by both surfaces of the negative lens component, which is advantageous in reducing spherical aberration at zoom positions near the telephoto end. In addition, the angle of incidence of off-axis beams on the object side lens surface and the image side lens surface of the rear lens component in the first lens unit at zoom positions near the wide angle end can be made small, which is advantageous in reducing aberrations at zoom positions near the wide angle end.

Still further, it is preferred that the image side lens surface of the front lens component in the first lens unit be an aspheric concave surface.

The effective diameter of the image side lens surface of the front lens component in the first lens unit is larger at the wide angle end than at the telephoto end, as with the lens surface closest to the object side. Therefore, the aspheric design of this lens surface facilitates, in cooperation with the aspheric surface on the object side, not only in reducing high-order spherical aberration at zoom positions near the telephoto end but also in reducing coma etc. at zoom positions near the wide angle end.

It is also preferred that the aperture stop be disposed just in front of the front lens component in the second lens unit. This facilitates a further reduction in the size of the first lens unit. In addition, this also facilitates providing the image side lens surface of the second lens unit with a function of refracting beams in directions away from the optical axis. Furthermore this also facilitates a reduction in the angle of incidence of off-axis beams on the image plane. In addition, the degree of symmetry of the composite system of the first lens unit and the second lens unit with respect to the aperture stop at the telephoto end is further increased, which is advantageous in correcting aberrations such as chromatic aberration of magnification at zoom positions near the telephoto end.

It is preferred that the following features be adopted in the three unit zoom lenses according to the first and the second aspects of the present invention.

It is preferred that the three unit zoom lens satisfy the following condition at the wide angle end:

$$1 < D_{12}/f_W < 4 \quad (4)$$

where $D_{12}$ is the distance, on the optical axis, from the lens surface closest to the image side in the first lens unit to the lens surface closest to the object side in the second lens unit at the wide angle end, and $f_W$ is the focal length of the entire three unit zoom lens system at the wide angle end.

Conditional (4) specifies preferred values of the distance between the first lens unit and the second lens unit that are advantageous in achieving an adequate zoom ratio, good optical performance and size reduction.

Providing an adequate distance between the first lens unit and the second lens unit so that the lower limit of conditional expression (4) is not exceeded is advantageous in achieving an adequate zoom ratio while making the refracting powers of the lens units low and facilitates a reduction in aberrations generated in the lens units, which is advantageous in achieving good optical performance throughout the entire zoom range.

If the upper limit of conditional expression (4) is not exceeded, the first lens unit is prevented from being located unduly distant from the aperture stop. This is advantageous in reducing the size of the first lens unit with respect to the diametrical direction.

It is also preferred that the second lens unit satisfy the following condition:

$$-0.7 < T_{2F}/f_W < -0.4 \quad (5)$$

where $T_{2F}$ is the distance, on the optical axis, from the lens surface closest to the object side in the second lens unit to the anterior principal point of the second lens unit wherein if the anterior principal point is located on the object side of the second lens unit, distance $T_{2F}$ is represented by a negative value, and $f_W$ is the focal length of the entire three unit zoom lens system at the wide angle end.

Locating the anterior principal point of the second lens unit closer to the object side than the object side lens surface of the second lens unit is advantageous in achieving a higher zoom ratio. Conditional expression (5) specifies preferred positions of the anterior principal point of the second lens unit. If the lower limit of conditional expression (5) is not exceeded, the curvature of lens surfaces can easily be prevented from becoming unduly large. This facilitates a reduction in the spherical aberration in the second lens unit, which in turn facilitates a reduction in variations in aberrations during zooming. If the upper limit of conditional expression (5) is not exceeded, the position of the posterior principal point of the first lens unit can easily be made closer to the object side. Thus, the negative lens(es) in the first lens unit can be designed to have a shape that facilitates manufacturing or machining. In addition, this is advantageous in achieving a higher zoom ratio.

It is preferred that the following condition be satisfied:

$$6 \leq N_t \leq 8 \quad (9)$$

where $N_t$ is the total number of lens elements included in the three unit zoom lens.

If the lower limit of conditional expression (9) is not exceeded, each lens unit in the zoom lens can be provided with an adequate refracting power, and reduction of aberration is facilitated. Having a small number of lens elements not more than the upper limit of conditional expression (9) is advantageous in making the zoom lens compact.

It is also preferred that the first lens unit include a front lens component having a negative refracting power that is located closest to the object side and has an aspheric object side surface and an aspheric image side surface. This configuration of the first lens unit enables suppression of spherical aberration, curvature of field, and distortion and is advantageous in providing a compact zoom lens with excellent aberration correction.

In the present invention, it is preferred that the total number of lens elements included in the second lens unit be not more than three. Having three of fewer lens elements in the second lens unit is advantageous in making the zoom lens compact.

It is also preferred that the second lens unit be composed of a single lens element having a positive refracting power, and a cemented lens component including a positive lens element and a negative lens element. This facilitates correction of aberrations when the zoom lens has a high zoom ratio and a wide angle of field.

It is also preferred that the second lens unit be composed of a single lens element having a positive refracting power and a single lens element having a negative refracting power. This is advantageous in reducing the size of the second lens unit while making aberrations small.

It is also preferred that the second lens unit have a positive lens element(s) and a negative lens element(s), and every negative lens element in the second lens unit have an Abbe number that is smaller than the Abbe number of any positive lens element in the second lens unit. This configuration is advantageous in correcting chromatic aberration and curvature of field.

It is preferred that the second lens unit satisfy the following conditions:

$$n_{2pave} \geq 1.59 \quad (10)$$

$$\nu_{2n} \leq 35 \quad (11)$$

where $n_{2pave}$ is the average of the refractive indices of all the positive lens elements in the second lens unit, and $\nu_{2n}$ is the Abbe number of all the negative lens elements in the second lens unit.

Using materials having high refractive indices that satisfy conditional expression (10) in the positive lens elements in the second lens unit facilitates correction of astigmatism.

Using materials having high dispersions that satisfy conditional expression (11) in the negative lens elements in, the second lens unit facilitates cancellation of chromatic aberration generated by the positive lens elements in the second lens unit, which is advantageous in reducing chromatic aberration.

It is preferred that the lens element closest to the image side in the second lens unit be a negative lens element having a concave surface directed toward the image side, and the thickness of the negative lens element on the optical axis be larger than the distance, on the optical axis, between the aforementioned front lens component and rear lens component in the second lens unit.

This enables a reduction in the thickness (i.e. the length along the optical axis) of the second lens unit on the optical axis. Having a negative lens element in the second lens unit provides cancellation of aberrations generated in the second lens unit, which is advantageous in improving the optical performance. In addition, an adequately large thickness of the negative lens element having a concave surface directed toward the image side facilitates correction of astigmatism etc.

It is preferred that the second lens unit include a positive lens element having an aspheric surface. The positive lens element in the second lens unit is designed to have a lens surface having a strong positive refracting power in order to provide the second lens unit with an adequate positive refracting power. In view of this, it is preferred that the positive lens element have an aspheric surface to correct spherical aberration etc.

It is also preferred that all the lens elements in the third lens unit satisfy the following conditions:

$$n_{3ave} \geq 1.4 \tag{12}$$

$$v_{3ave} \geq 50 \tag{13}$$

where $n_{3ave}$ is the average of the refractive indices of all the lens elements in the third lens unit, and $v_{3ave}$ is the average of the Abbe numbers of all the lens elements in the third lens unit.

Using materials having high refractive indices that satisfy conditional expression (12) in all the lens elements in the third lens unit facilitates correction of astigmatism. Using materials having low dispersions that satisfy conditional expression (13) is advantageous in reducing chromatic aberration.

It is also preferred that the total number of lens elements included in the third lens unit be two, and one of them have an aspheric surface. This is advantageous in reducing the size of the third lens unit and in reducing the cost. Use of aspheric surface is advantageous in correcting astigmatism on the occasion of shooting an object at a very short distance. In order to achieve good optical performance, it is preferred that one or both of the surfaces of the rear lens component in the third lens unit be aspheric, and the absolute value of the paraxial radius of curvature of the image side lens surface of this lens component be smaller than that of the object side lens surface thereof.

It is preferred that the third lens unit include at least one lens element that is made of a resin. Having at least one lens made of a resin in the third lens unit leads to a reduction in the cost and makes lens molding easier.

It is preferred that the rear lens component in the second lens unit and the front lens component in the third lens unit both have a meniscus shape having a negative refracting power. This is advantageous in correcting chromatic aberration of the lens units. In addition, this further increases the degree of symmetry of the composite system of the second lens unit and the third lens unit, which facilitates a reduction in aberrations at zoom positions near the wide angle end.

It is preferred that during zooming from the wide angle end to the telephoto end, the first lens unit move first toward the image side and thereafter reverse its moving direction to move toward the object side, and the third lens unit be located at a position closer to the image side at the telephoto end than its position at the wide angle end. This facilitates a reduction in the entire length of the lens system in use, and therefore facilitates slimming the lens frame along the optical axis direction. In addition, the first lens unit can be made operable to reduce variations in the image position during zooming. Furthermore, the third lens unit can also provide a magnification change, which provides a further advantage in achieving an adequate zoom ratio.

An image pickup apparatus according to the present invention has a zoom lens and an image pickup element that has an image pickup surface disposed on the image side of the zoom lens and converts an optical image formed on the image pickup surface by the zoom lens into an electrical signal. It is preferred that the zoom lens be the three unit zoom lens described in the foregoing.

Thus, there can be provided an image pickup apparatus equipped with a zoom lens that is advantageous in achieving an adequate zoom ratio, angle of field, and good optical performance while being compact.

It is preferred that the image pickup apparatus be provided with a signal processing circuit that processes image data obtained through image pickup by the image pickup element and outputs processed image data representing a transformed image, and the three unit zoom lens satisfy the following condition in a state in which the zoom lens is set to the wide angle end and focused on the farthest distance:

$$0.7 < y_{07}/(f_W \tan \omega_{07w}) < 1.0 \tag{14}$$

where $y_{07} = 0.7 \times y_{10}$, $y_{10}$ is the distance from the center of the effective image pick area of the image pickup element to the point farthest from the center within the effective image pickup area, wherein if the effective image pickup area changes during zooming from the wide angle end to the telephoto end, $y_{10}$ is the maximum value of the aforementioned distance, $\omega_{07w}$ is the angle formed by the optical axis and an incident ray in the object space of a principal ray that is incident on an image position at an image height of $y_{07}$ from the center of the image pickup surface at the wide angle end.

In the case of a small-size zoom lens like that according to the present invention, there tends to be a trade-off between correction of astigmatism and correction of barrel distortion. In view of this, a certain degree of distortion may be allowed to be left in the image formed by the zoom lens, and distortion of the image may be corrected by image processing in the electronic image pickup apparatus equipped with the zoom optical system according to the present invention. This process will be described in detail in the following.

Suppose that an image of an object at infinity is formed by an optical system free from distortion. In this case, the image has no distortion, and the following equation holds:

$$f = y/\tan \omega \tag{15}$$

where y is the height of the image point from the optical axis, f is the focal length of the imaging optical system, ω is the angle of direction toward an object corresponding to an image point formed at a position at distance y from the center of the image pickup surface with respect to the optical axis.

On the other hand, in the case of an optical system having barrel distortion only at zoom positions near the wide angle end, the following inequality holds:

$$f > y/\tan \omega \tag{16}$$

This means that if the values of ω and y are fixed, the focal length at the wide angle end may be longer. Therefore, it is made easy to design a zoom lens with reduced aberrations. The reason why a lens unit corresponding to the above described first lens unit is typically designed to have two or more lens components is that correction of distortion and correction of astigmatism are both to be achieved. This is not required in this mode of the invention. Therefore, this mode of the invention is advantageous in astigmatism correction.

In the electronic image pickup apparatus according to the present invention, the image data obtained by the electronic image pickup element is processed by image processing. In this processing, the image data (or the shape of the image represented by the image data) is transformed in such a way that barrel distortion is corrected. Thus, the resultant image data will represent an image substantially geometrically similar to the object. Therefore, an image of the object may be output to a CRT or a printer based on this image data.

In cases where image data correction is performed, an effective image pickup area having a barrel shape is used at the wide angle end. The image data of the effective image pickup area having a barrel shape is transformed into image data representing a rectangular image.

Conditional expression (14) limits the degree of barrel distortion at the wide angle end of the zoom range. If conditional expression (14) is satisfied, correction of astigmatism can be achieved without difficulty. An image distorted in a barrel shape is photo-electrically converted by the image pickup element into image data containing barrel distortion. However, the image data containing barrel distortion is electrically processed in accordance with deformation of the image by image processing means or a signal processing system in the electronic image pickup apparatus. Thus, if the image data finally output from the image processing means is reproduced on a display apparatus, an image that has been corrected in terms of distortion and is substantially similar to the shape of the object can be obtained.

If the lower limit of conditional expression (14) is not exceeded so that distortion generated in the zoom lens is made small, when correction of image distortion caused by distortion of the zoom lens is performed by the signal processing circuit, the rate of expansion of the peripheral region of the image in radial directions after the correction is made small. This helps to reduce deterioration of sharpness in the peripheral region of the image.

If the upper limit of conditional expression is not exceeded so that the zoom lens is allowed to have distortion, correction of astigmatism of the zoom lens is facilitated, which is advantageous in slimming the zoom lens.

Although the effective image pickup area at the wide angle end may be designed in such a way that distortion is completely corrected, an appropriate degree of distortion such as distortion of approximately −3% or −5% may be left after transformation of image data in view of the effect of perspective and deterioration of image quality in the peripheral region of the image.

It is more preferred that the following modifications of conditional expressions (1) to (14) and (A) to (D), which have been presented in the foregoing and will be presented later, be satisfied.

$$3.5 < (R_{2F}+R_{2R})/(R_{2F}-R_{2R}) < 8 \quad (1')$$

$$4.5 < (R_{2F}+R_{2R})/(R_{2F}-R_{2R}) < 14 \quad (1'')$$

$$1.5 < (R_{3F}+R_{3R})/(R_{3F}-R_{3R}) < 10 \quad (2')$$

$$2 < (R_{3F}+R_{3R})/(R_{3F}-R_{3R}) < 7 \quad (2'')$$

$$0.2 < (R_{1F}+R_{2R})/(R_{1F}-R_{2R}) < 0.9 \quad (3')$$

$$0.25 < (R_{1F}+R_{2R})/(R_{1F}-R_{2R}) < 0.8 \quad (3'')$$

$$2.5 < D_{12}/f_W < 3.5 \quad (4')$$

$$2 < D_{12}/f_W < 3 \quad (4'')$$

$$-0.65 < T_{2F}/f_W < -0.45 \quad (5')$$

$$-0.6 < T_{2F}/f_W < -0.5 \quad (5'')$$

$$-0.55 > f_{3FF}/f_{3FR} > -1.15 \quad (6')$$

$$-0.6 > f_{3FF}/f_{3FR} > -1.1 \quad (6'')$$

$$-1.7 < f_{1F}/f_W < -1.2 \quad (7')$$

$$-1.6 < f_{1F}/f_W < -1.3 \quad (7'')$$

$$3.0 < f_{1R}/f_W < 7 \quad (8')$$

$$3.5 < f_{1R}/f_W < 8 \quad (8'')$$

$$n_{2pave} \geq 1.50 \quad (10')$$

$$n_{2pave} \geq 1.52 \quad (10'')$$

$$v_{2n} \leq 30 \quad (11')$$

$$v_{2n} \leq 26 \quad (11'')$$

$$n_{3ave} \geq 1.50 \quad (12')$$

$$n_{3ave} > 1.52 \quad (12'')$$

$$v_{3ave} > 58 \quad (13')$$

$$v_{3ave} \geq 80 \quad (13'')$$

$$0.75 < y_{07}/(f_W \cdot \tan \omega_{07w}) < 0.99 \quad (14')$$

$$0.80 < y_{07}/(f_W \cdot \tan \omega_{07w}) < 0.97 \quad (14'')$$

$$-0.8 < (R_{2R}+R_{3F})/(R_{2R}-R_{3F}) < -0.2 \quad (A')$$

$$-0.7 < (R_{2R}+R_{3F})/(R_{2R}-R_{3F}) < -0.4 \quad (A'')$$

$$10 < (R_{3FR}+R_{3RF})/(R_{3FR}-R_{3RF}) < -0.3 \quad (B')$$

$$8 < (R_{3FR}+R_{3RF})/(R_{3FR}-R_{3RF}) < -0.6 \quad (B'')$$

$$0.3 < (R_{3RF}+R_{3R})/(R_{3RF}-R_{3R}) < 2.7 \quad (C')$$

$$0.5 < (R_{3RF}+R_{3R})/(R_{3RF}-R_{3R}) < 2.3 \quad (C'')$$

$$0.5 < (R_{1F}+R_{1FR})/(R_{1F}-R_{1FR}) < 0.98 \quad (D')$$

$$0.6 < (R_{1F}+R_{1FR})/(R_{1F}-R_{1FR}) < 0.9 \quad (D'')$$

In order to facilitate a reduction in the cost of the positive lens elements in the second lens unit, it is preferred that an upper limit be placed on the value of $n_{2pave}$, and a material that satisfies the following condition be used:

$$n_{2pave} \leq 2.2 \quad (10A),$$

more preferably, a material that satisfies the following condition be used:

$$n_{2pave} \leq 1.8 \quad (10A').$$

In order to facilitate a reduction in the cost of the negative lens elements in the second lens unit, it is preferred that a lower limit be placed on the value of $v_{2n}$, and a material that satisfies the following condition be used:

$$v_{2n} \geq 10 \quad (11A),$$

more preferably, a material that satisfies the following condition be used:

$$v_{2n} \geq 15 \quad (11A').$$

In order to facilitate a reduction in the cost of the lens elements in the third lens unit, it is preferred that an upper limit be placed on the value of $n_{3ave}$, and a material that satisfies the following condition be used:

$$n_{3ave} \leq 2.2 \quad (12A),$$

more preferably, a material that satisfies the following condition be used:

$$n_{3ave} \leq 1.8 \quad (12A').$$

In order to facilitate a reduction in the cost of the lens elements in the third lens unit, it is preferred that an upper limit be placed on the value of $v_{3ave}$, and a material that satisfies the following condition be used:

$$v_{3ave} \leq 95 \quad (12A),$$

more preferably, a material that satisfies the following condition be used:

$$v_{3ave} \leq 82 \qquad (12A'),$$

still more preferably, a material that satisfies the following condition be used:

$$v_{3ave} \leq 58 \qquad (12A'').$$

In the above modifications of the conditional expressions, only the upper limit value or the lower limit value in each conditional expression may be replaced by the modified upper limit value or lower limit value.

In the case where the zoom lens has a focusing function, the conditions and features of the three unit zoom lens according to the present invention described in the foregoing and the following should be regarded as conditions and features in the state in which the zoom lens is focused on an object at the farthest distance.

It is preferred that focusing operation from an object at a long distance to an object at a short distance be performed by advancing the entire three unit zoom lens toward the object side, advancing only the first lens unit toward the object side, or advancing only the third lens unit toward the object side.

It is more preferred that two or more of the above described features be adopted at the same time. In each of the more preferred numerical range limitations, limitation by only the upper limit value or the lower limit value may be applied. Furthermore, the various features described above may be adopted in any possible combination.

The present invention can provide a three unit zoom lens that is advantageous in achieving an adequate angle of field, an adequate zoom ratio, and good optical performance while preventing increases in the number of lens components included in the second and subsequent lens units. The present invention can also provide an image pickup apparatus equipped with such a three unit zoom lens.

In the following, embodiments of the zoom lens and the image pickup apparatus according to the present invention will be described in detail with reference to the drawings. It should be understood, however, that the present invention is not limited by the embodiments.

In the following, first to eighth embodiments of the zoom lens according to the present invention will be described. FIGS. 1A, 1B and 1C to 8A, 8B and 8C are cross sectional views of the zoom lenses according to the first to the eighth embodiments respectively at the wide angle end (FIGS. 1A to 8A), in an intermediate focal length state (FIGS. 1B to 8B), and at the telephoto end (FIGS. 1C to 8C) in the state in which the zoom lenses are focused on an object point at infinity. In FIGS. 1A through 8C, a first lens unit is denoted by G1, a second lens unit is denoted by G2, an aperture stop is denoted by S, a third lens unit is denoted by G3, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

In all the embodiments, the aperture stop S moves integrally with the second lens unit G2. All the numerical data presented below are for the state in which the zoom lens is focused on an object at infinity. In the numerical data, dimensions are in mm (millimeters) and angles are in degrees. Zoom data will be presented for the states at the wide angle end (WE), in the intermediate focal length states (ST) defined in the present invention, and at the telephoto end (TE).

Figure 1B:
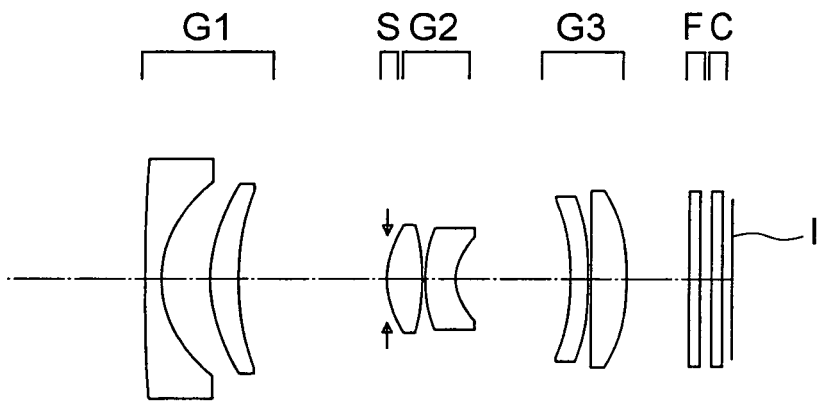
Figure 1C:
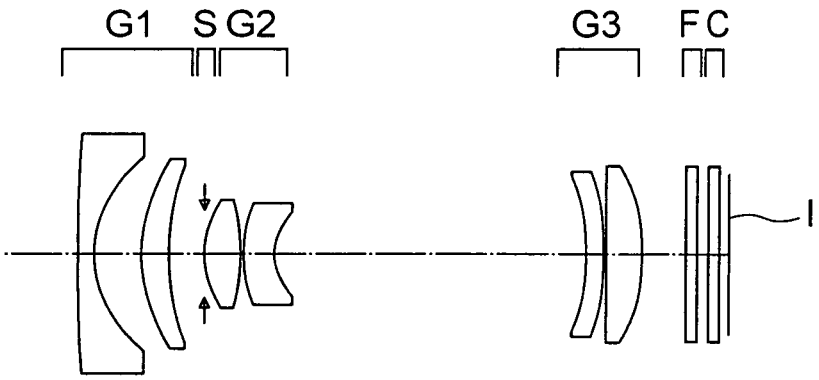

As shown in FIGS. 1A to 1C, the zoom lens according to the first embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves only toward the image side.

The first lens unit G1 is composed, in order from the object side, of a biconcave negative lens and a positive meniscus lens having a convex surface directed toward the object side. The second lens unit is composed, in order from the object side, of a biconvex positive lens and a negative meniscus lens having a convex surface directed toward the object side. The third lens unit G3 is composed, in order from the object side, of a negative meniscus lens having a convex surface directed toward the image side, and a biconvex positive lens.

The following five lens surfaces are aspheric surfaces: both surfaces of the biconcave negative lens in the first lens unit G1, both surfaces of the biconvex positive lens in the second lens unit G2, and the image side surface of the biconvex positive lens in the third lens unit G3.

Figure 2A:
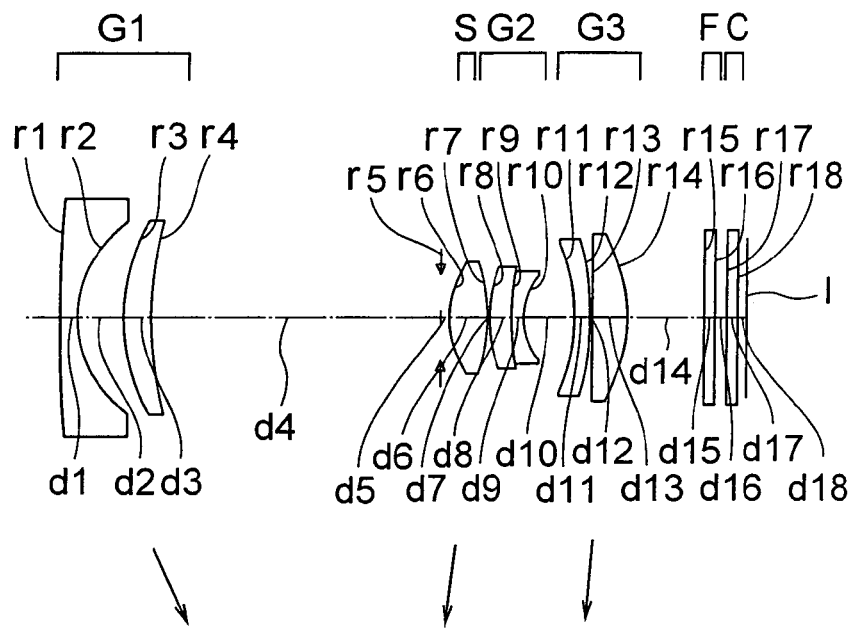
FIGS. 2A, 2B, and 2C are cross sectional views similar to FIGS. 1A, 1B, and 1C showing a zoom lens according to a second embodiment of the present invention.
Figure 2B:
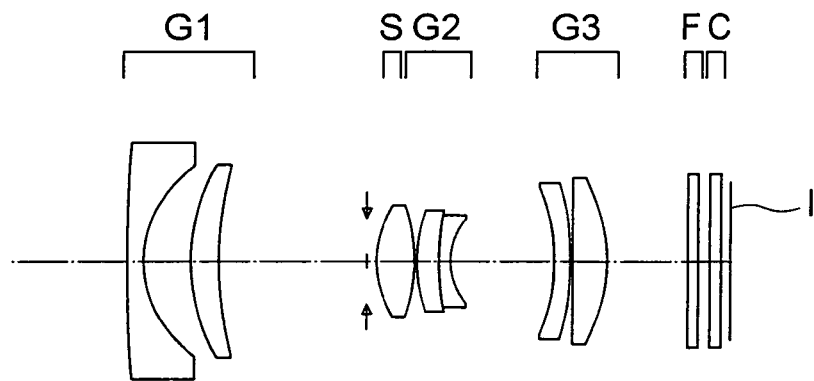
Figure 2C:
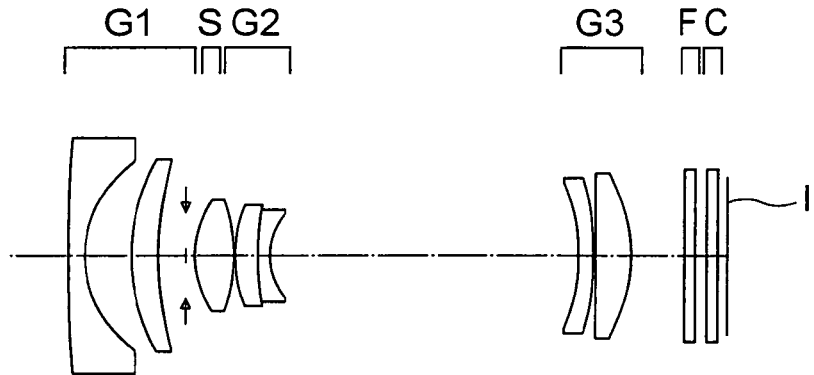

As shown in FIGS. 2A to 2C, the zoom lens according to the second embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves first toward the object side and thereafter toward the image side in such a way as to be located closer to the image side at the telephoto end than at the wide angle end.

The first lens unit G1 is composed, in order from the object side, of a biconcave negative lens and a positive meniscus lens having a convex surface directed toward the object side. The second lens unit is composed, in order from the object side, of a biconvex positive lens, a positive meniscus lens having a convex surface directed toward the object side, and negative meniscus lens having a convex surface directed toward the object side. The third lens unit G3 is composed, in order from the object side, of a negative meniscus lens having a convex surface directed toward the image side and a positive meniscus lens having a convex surface directed toward the image side.

The following five lens surfaces are aspheric surfaces: both surfaces of the biconcave negative lens in the first lens unit G1, both surfaces of the biconvex positive lens in the second lens unit G2, and the image side surface of the positive meniscus lend having a convex surface directed toward the image side in the third lens unit G3.

Figure 3A:
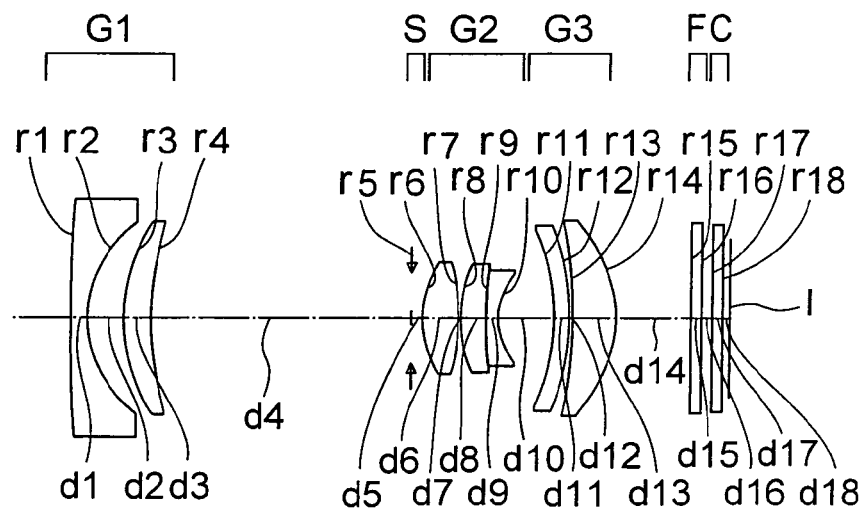
FIGS. 3A, 3B, and 3C are cross sectional views similar to FIGS. 1A, 1B, and 1C showing a zoom lens according to a third embodiment of the present invention.
Figure 3B:
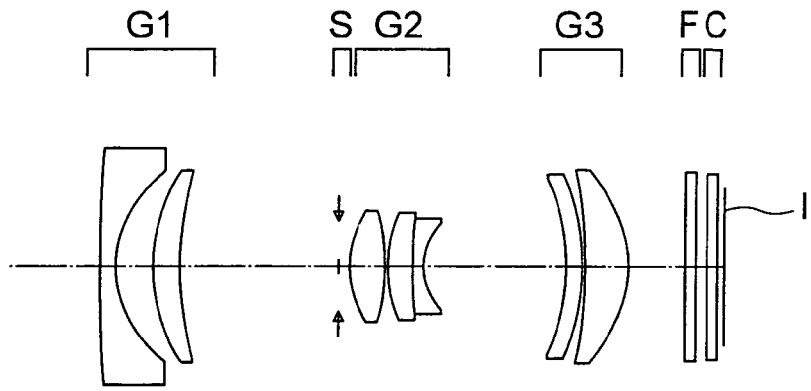
Figure 3C:
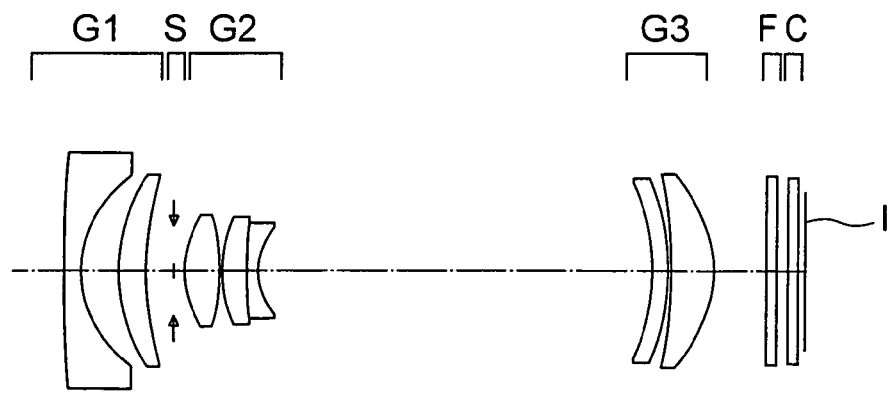

As shown in FIGS. 3A to 3C, the zoom lens according to the third embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves only toward the image side.

The first lens unit G1 is composed, in order from the object side, a biconcave negative lens and a positive meniscus lens having a convex surface directed toward the object side. The second lens unit G2 is composed, in order from the object side, of a biconvex positive lens, and a cemented lens composed of a positive meniscus lens having a convex surface directed toward the object side and a negative meniscus lens having a convex surface directed toward the object side. The third lens unit G3 is composed, in order from the object side, a first positive meniscus lens having a convex surface directed toward the image side and a second positive meniscus lens having a convex surface directed toward the image side.

The following six lens surfaces are aspheric surfaces: both surfaces of the biconcave negative lens in the first lens unit G1, both surfaces of the biconvex positive lens in the second lens unit G2, the object side surface of the first positive meniscus lens having a convex surface directed toward the image side in the third lens unit G3, and the image side surface of the second positive meniscus lens having a convex surface directed toward the image side in the third lens unit G3.

Figure 4A:
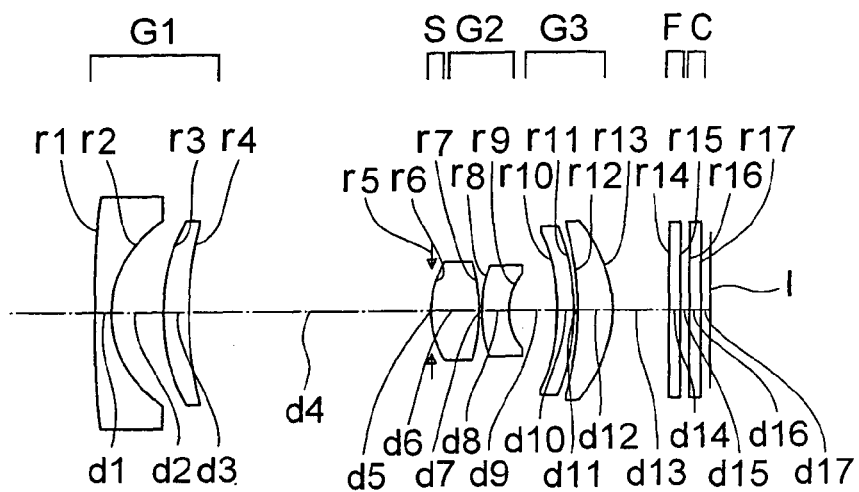
FIGS. 4A, 4B, and 4C are cross sectional views similar to FIGS. 1A, 1B, and 1C showing a zoom lens according to a fourth embodiment of the present invention.
Figure 4B:
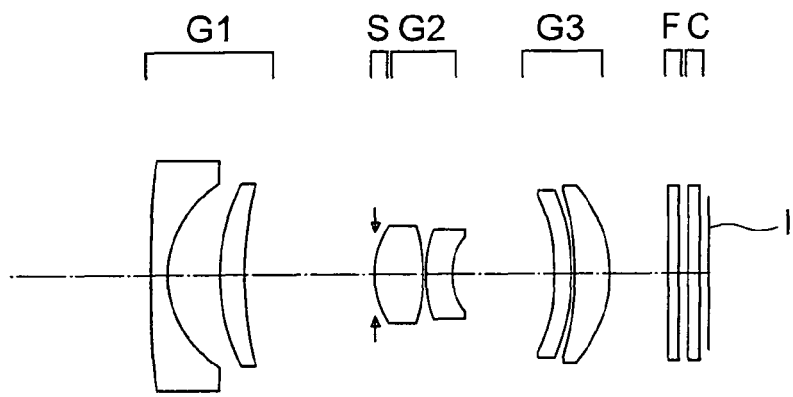
Figure 4C:
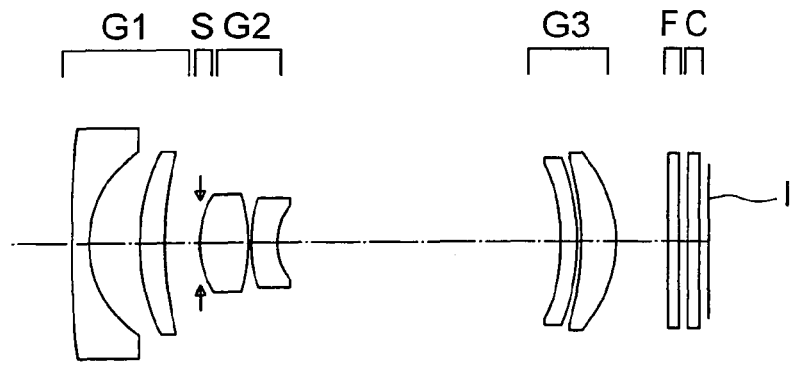

As shown in FIGS. 4A to 4C, the zoom lens according to the fourth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves first toward the object side and thereafter toward the image side in such a way as to be located closer to the image side at the telephoto end than at the wide angle end.

The first lens unit G1 is composed, in order from the object side, of a biconcave negative lens and a positive meniscus lens having a convex surface directed toward the object side. The second lens unit is composed, in order from the object side, of a biconvex positive lens and a negative meniscus lens having a convex surface directed toward the object side. The third lens unit G3 is composed, in order from the object side, of a negative meniscus lens having a convex surface directed toward the image side, and a positive meniscus lens having a convex surface directed toward the image side.

The following six lens surfaces are aspheric surfaces: both surfaces of the biconcave negative lens in the first lens unit G1, the object side surface of the positive meniscus lens having a convex surface directed toward to the object side in the first lens unit G1, both surfaces of the biconvex positive lens in the second lens unit G2, and the image side surface of the positive meniscus lens having a convex surface directed toward to the image side in the third lens unit G3.

Figure 5A:
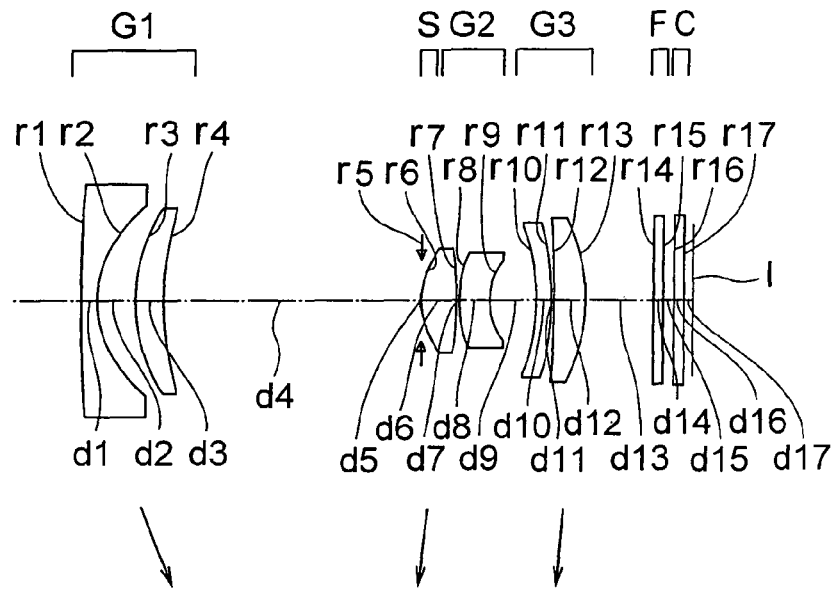
FIGS. 5A, 5B, and 5C are cross sectional views similar to FIGS. 1A, 1B, and 1C showing a zoom lens according to a fifth embodiment of the present invention.
Figure 5B:
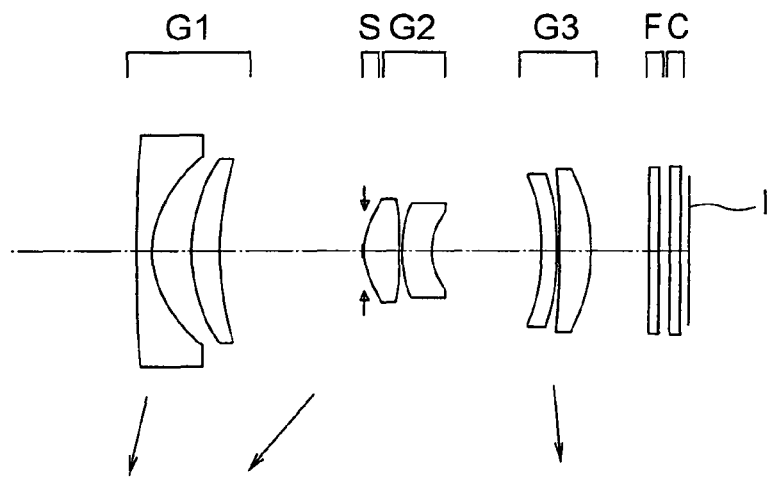
Figure 5C:
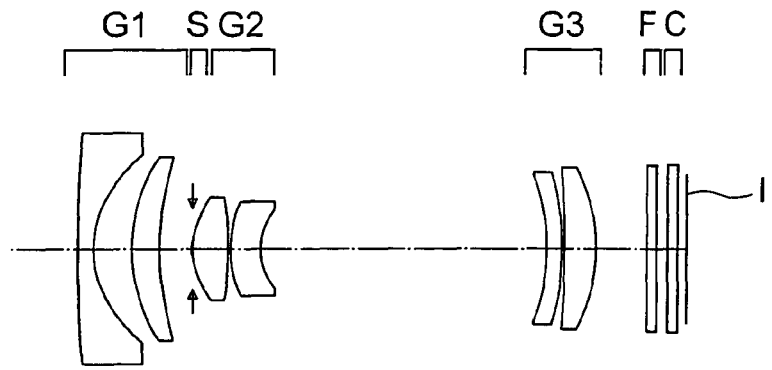

As shown in FIGS. 5A to 5C, the zoom lens according to the fifth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves only toward the image side.

The first lens unit G1 is composed, in order from the object side, of a biconcave negative lens and a positive meniscus lens having a convex surface directed toward the object side. The second lens unit is composed, in order from the object side, of a biconvex positive lens and a negative meniscus lens having a convex surface directed toward the object side. The third lens unit G3 is composed, in order from the object side, of a negative meniscus lens having a convex surface directed toward the image side, and a positive meniscus lens having a convex surface directed toward the image side.

The following seven lens surfaces are aspheric surfaces: both surfaces of the biconcave negative lens in the first lens unit G1, both surfaces of the biconvex positive lens in the second lens unit G2, the image side surface of the negative meniscus lens having a convex surface directed toward the object side in the second lens unit G2, the object side surface of the negative meniscus lens having a convex surface directed toward the image side in the third lens unit G3, and the image side surface of the positive meniscus lens having a convex surface directed toward the image side in the third lens unit G3.

Figure 6A:
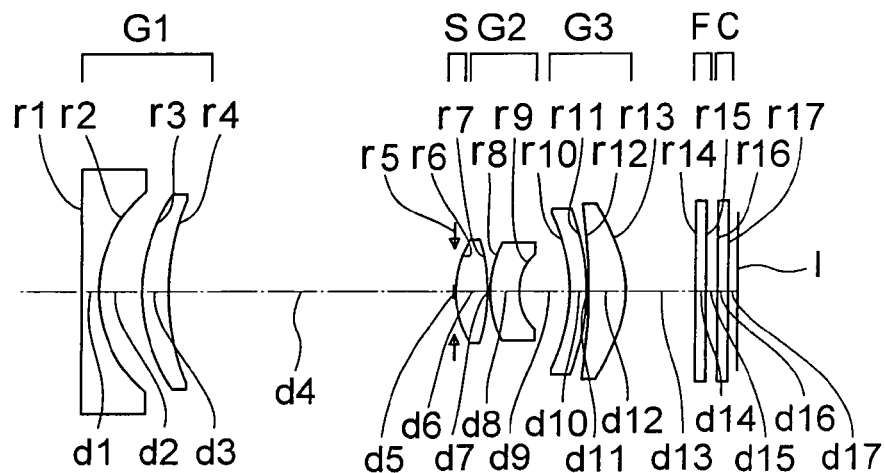
FIGS. 6A, 6B, and 6C are cross sectional views similar to FIGS. 1A, 1B, and 1C showing a zoom lens according to a sixth embodiment of the present invention.
Figure 6B:
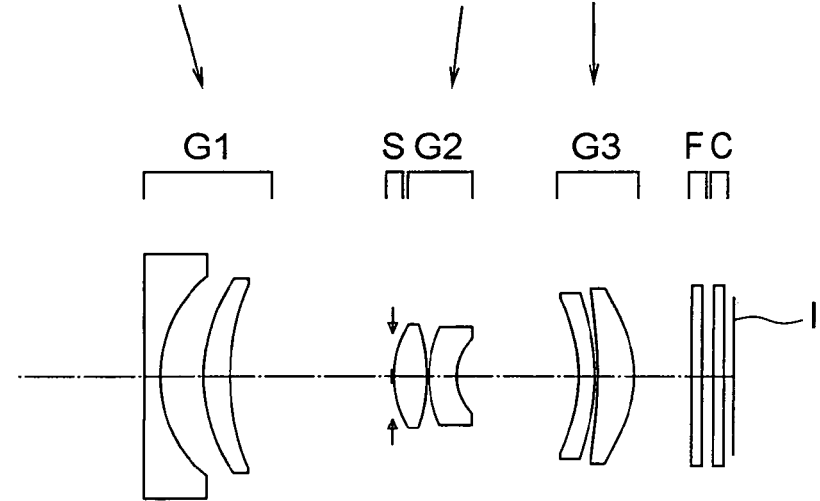
Figure 6C:
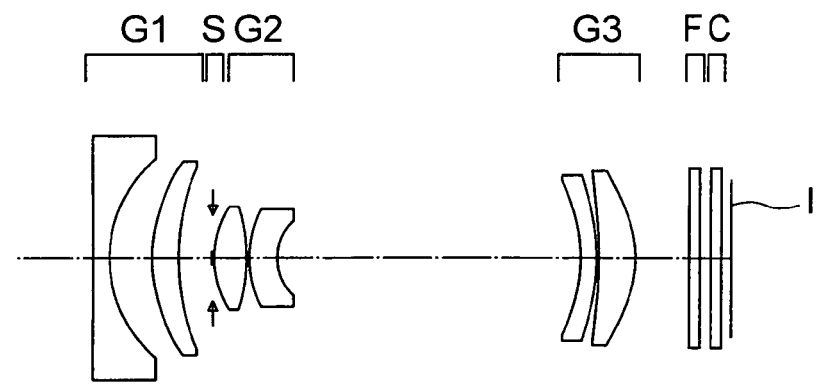

As shown in FIGS. 6A to 6C, the zoom lens according to the sixth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves only toward the image side.

The first lens unit G1 is composed, in order from the object side, of a negative meniscus lens having a convex surface directed toward the object side and a positive meniscus lens having a convex surface directed toward the object side. The second lens unit is composed, in order from the object side, of a biconvex positive lens and a negative meniscus lens having a convex surface directed toward the object side. The third lens unit G3 is composed, in order from the object side, of a negative meniscus lens having a convex surface directed toward the image side, and a positive meniscus lens having a convex surface directed toward the image side.

The following four lens surfaces are aspheric surfaces: the image side surface of the negative meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 7A:
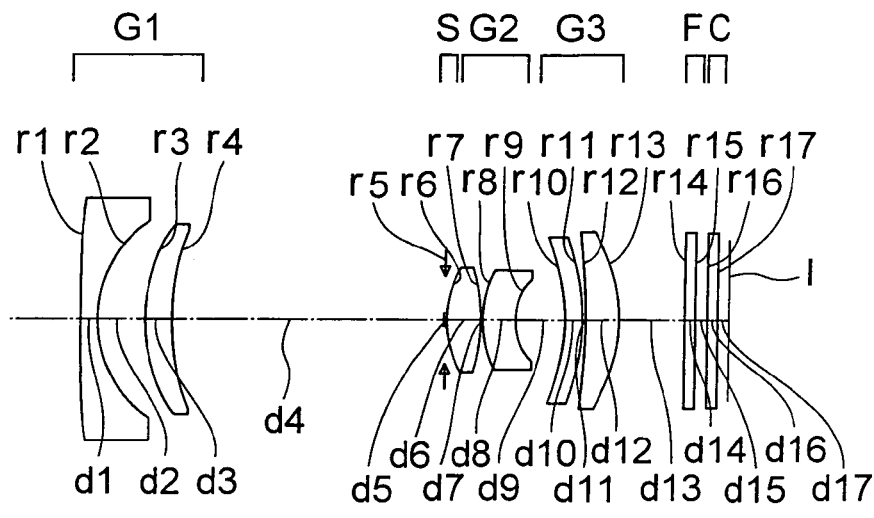
FIGS. 7A, 7B, and 7C are cross sectional views similar to FIGS. 1A, 1B, and 1C showing a zoom lens according to a seventh embodiment of the present invention.
Figure 7B:
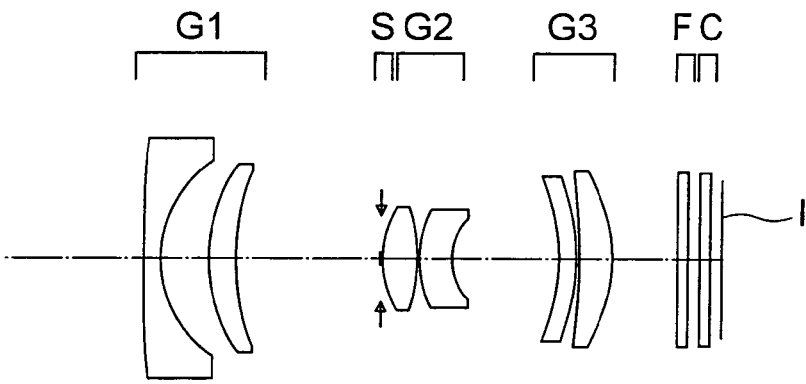
Figure 7C:
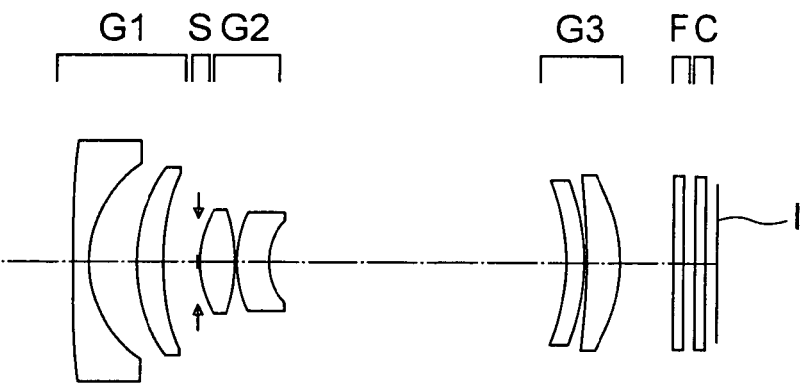

As shown in FIGS. 7A to 7C, the zoom lens according to the seventh embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves only toward the image side.

The first lens unit G1 is composed, in order from the object side, of a biconcave negative lens and a positive meniscus lens having a convex surface directed toward the object side. The second lens unit is composed, in order from the object side, of a biconvex positive lens and a negative meniscus lens having a convex surface directed toward the object side. The third lens unit G3 is composed, in order from the object side, of a negative meniscus lens having a convex surface directed toward the image side, and positive meniscus lens having a convex surface directed toward the image side.

The following five lens surfaces are aspheric surfaces: both surfaces of the biconcave negative lens in the first lens unit G1, both surfaces of the biconvex positive lens in the second lens unit G2, and the image side surface of the positive meniscus lens having a convex surface directed toward the image side in the third lens unit G3.

Figure 8A:
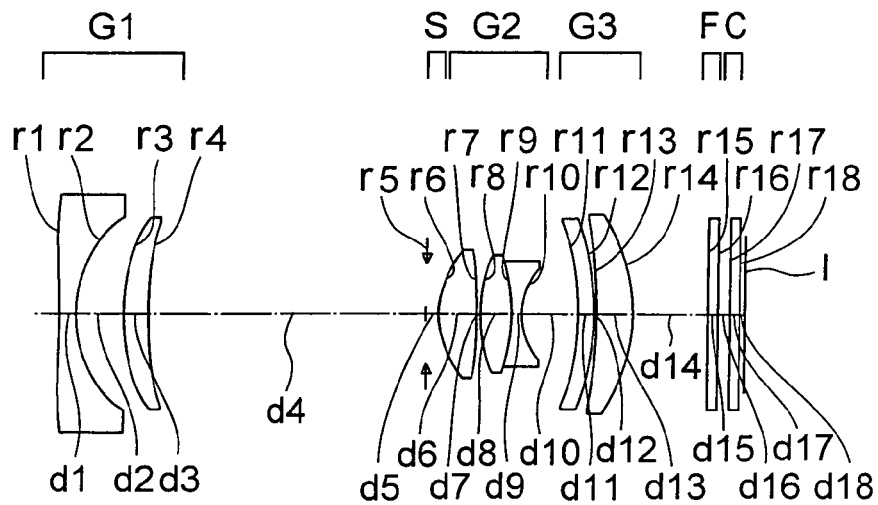
FIGS. 8A, 8B, and 8C are cross sectional views similar to FIGS. 1A, 1B, and 1C showing a zoom lens according to a eighth embodiment of the present invention.
Figure 8B:
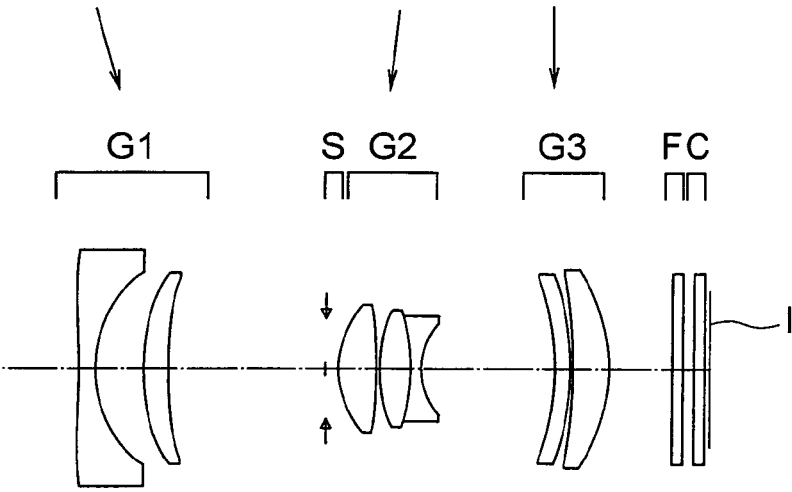
Figure 8C:
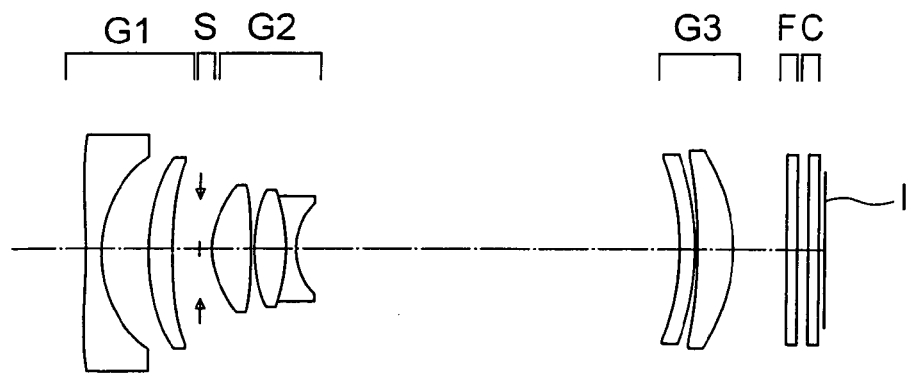
Figure 9A:
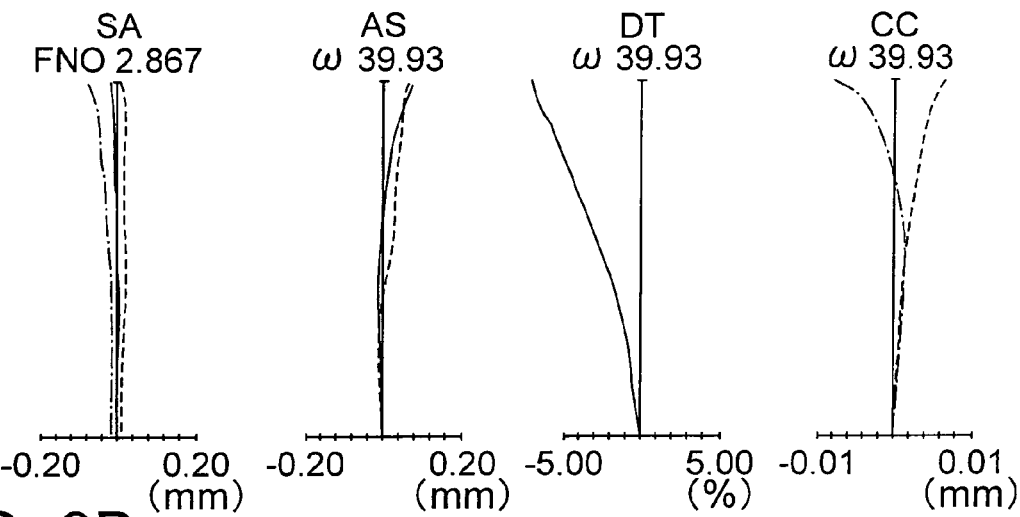
FIGS. 9A, 9B and 9C are diagrams showing spherical aberration, astigmatism, distortion, and chromatic aberration of magnification of the zoom lens according to the first embodiment in the state in which the zoom lens is focused on an object point at infinity respectively at the wide angle end (FIG. 9A), in the intermediate state (FIG. 9B), and the telephoto end (FIG. 9C)
Figure 9B:
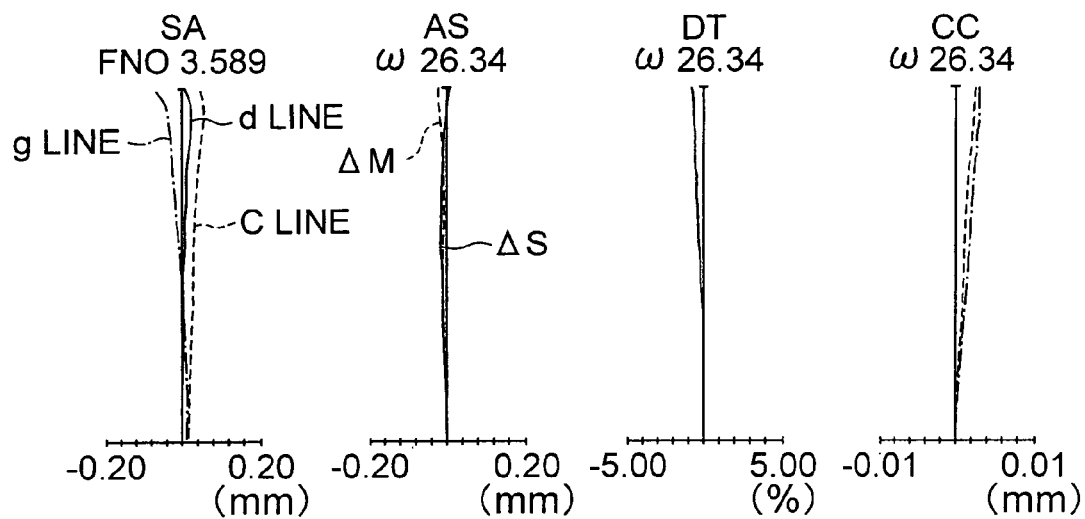
Figure 9C:
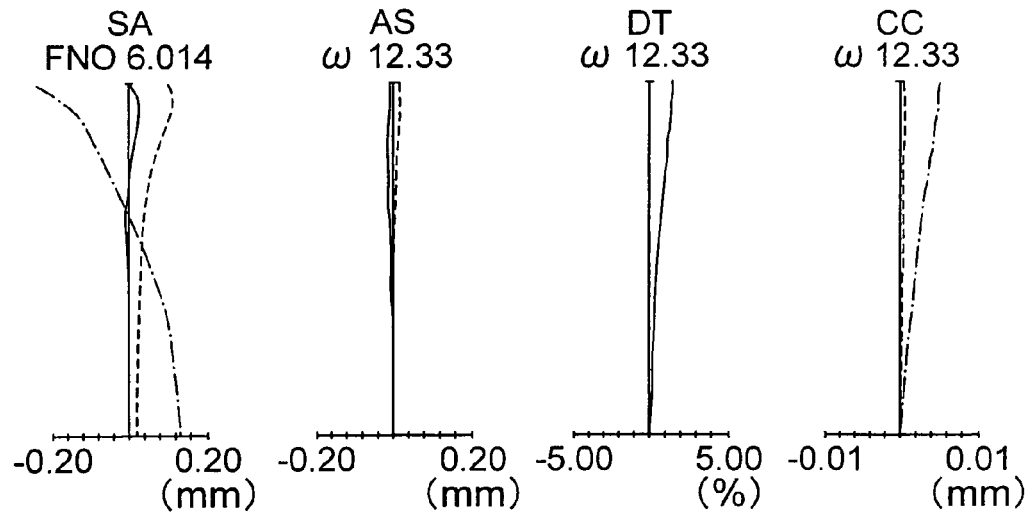
Figure 10A:
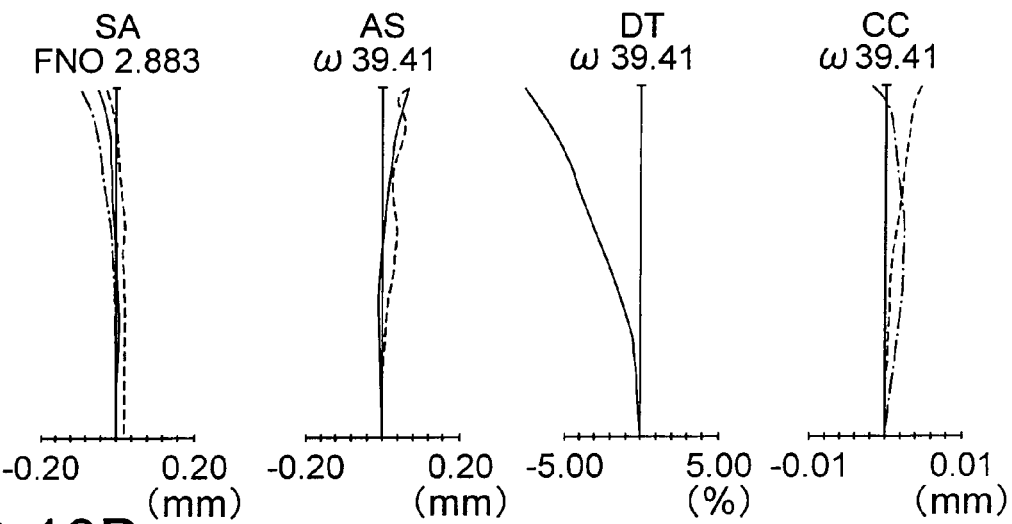
FIGS. 10A, 10B, and 10C are diagram similar to FIGS. 9A, 9B, and 9C showing aberrations of the zoom lens according to the second embodiment in the state in which the zoom lens is focused on an object point at infinity.
Figure 10B:
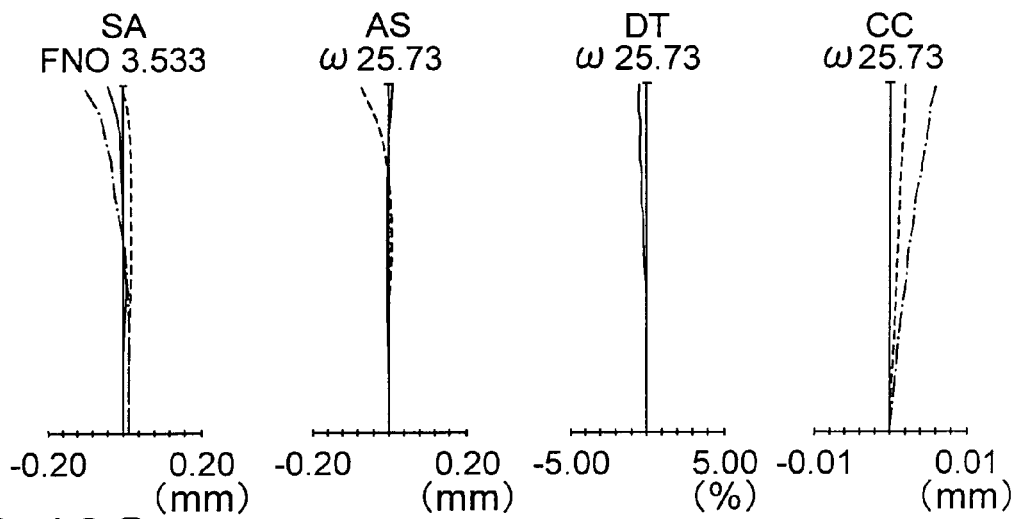
Figure 10C:
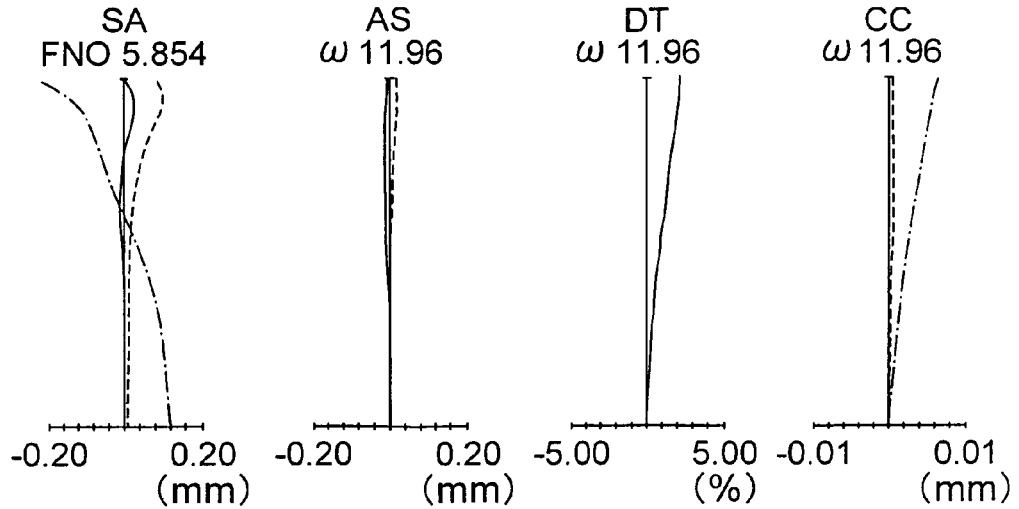
Figure 11A:
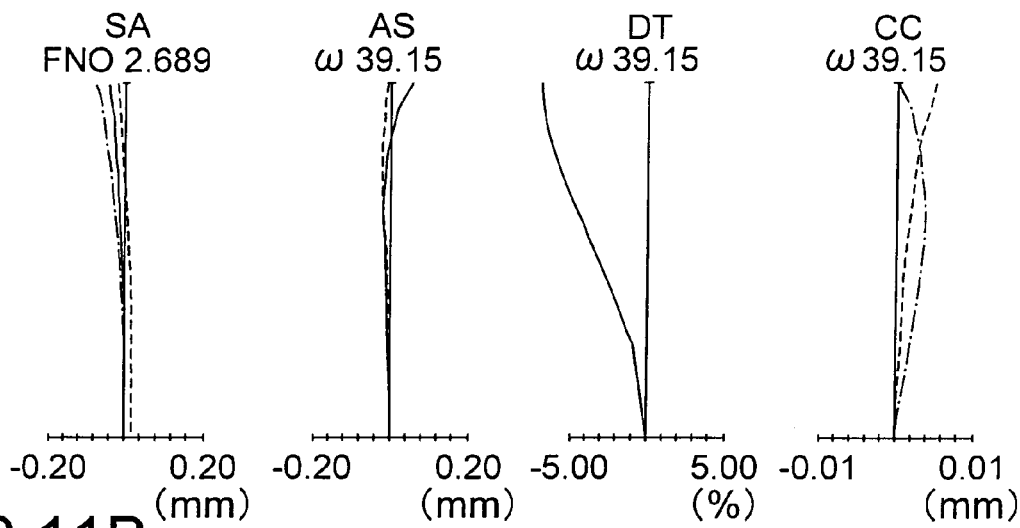
FIGS. 11A, 11B, and 11C are diagram similar to FIGS. 9A, 9B, and 9C showing aberrations of the zoom lens according to the third embodiment in the state in which the zoom lens is focused on an object point at infinity.
Figure 11B:
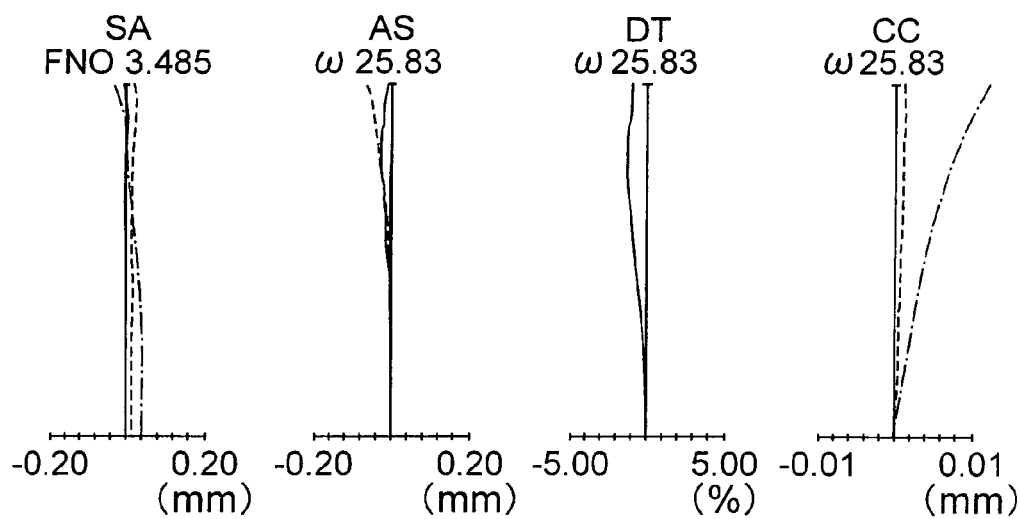
Figure 11C:
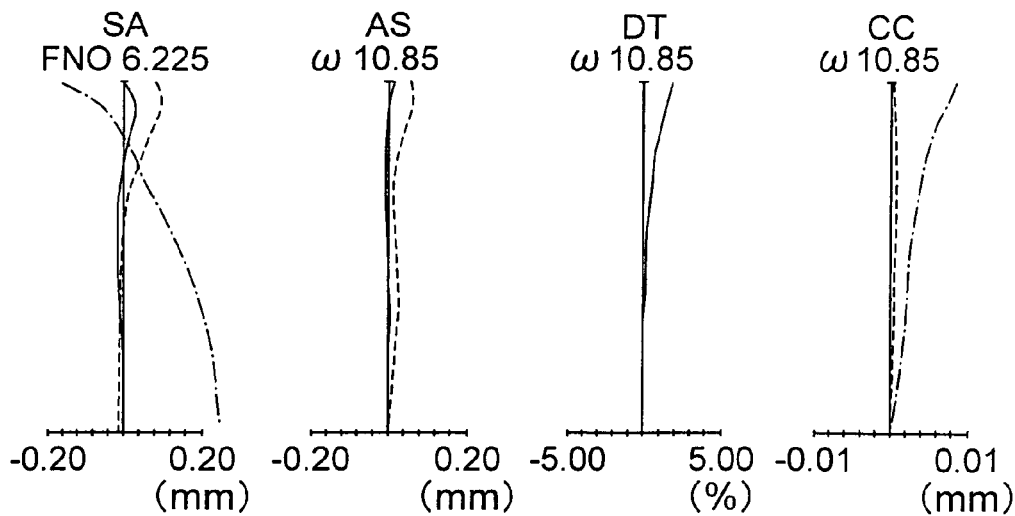
Figure 12A:
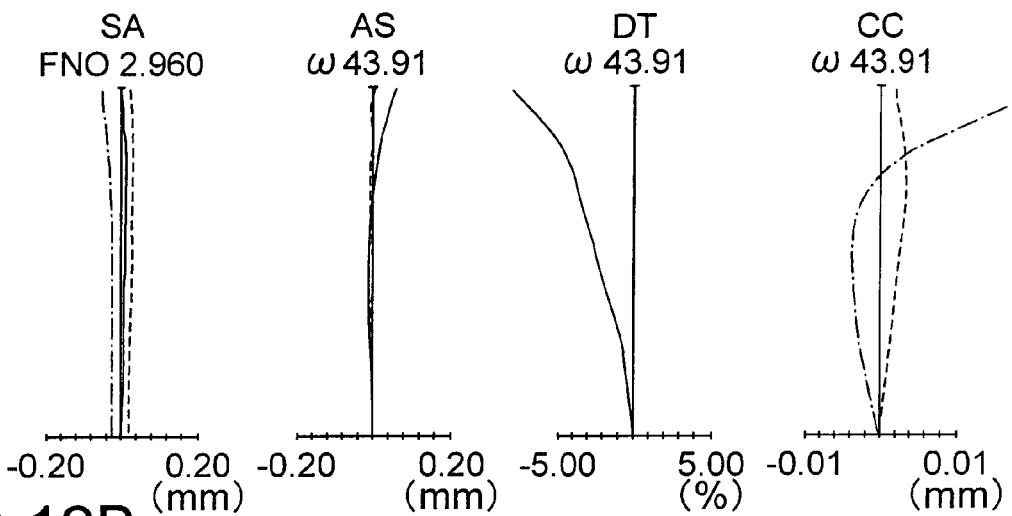
FIGS. 12A, 12B, and 12C are diagram similar to FIGS. 9A, 9B, and 9C showing aberrations of the zoom lens according to the fourth embodiment in the state in which the zoom lens is focused on an object point at infinity.
Figure 12B:
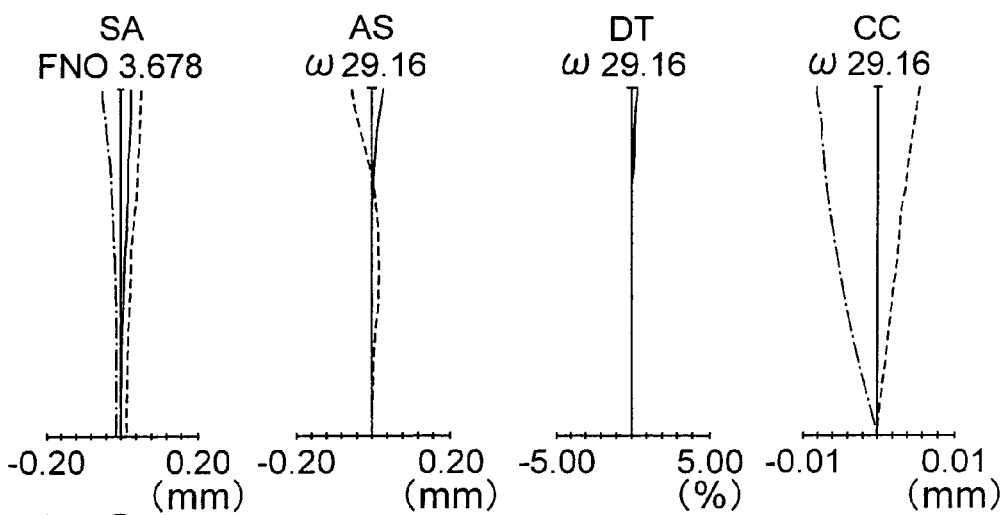
Figure 12C:
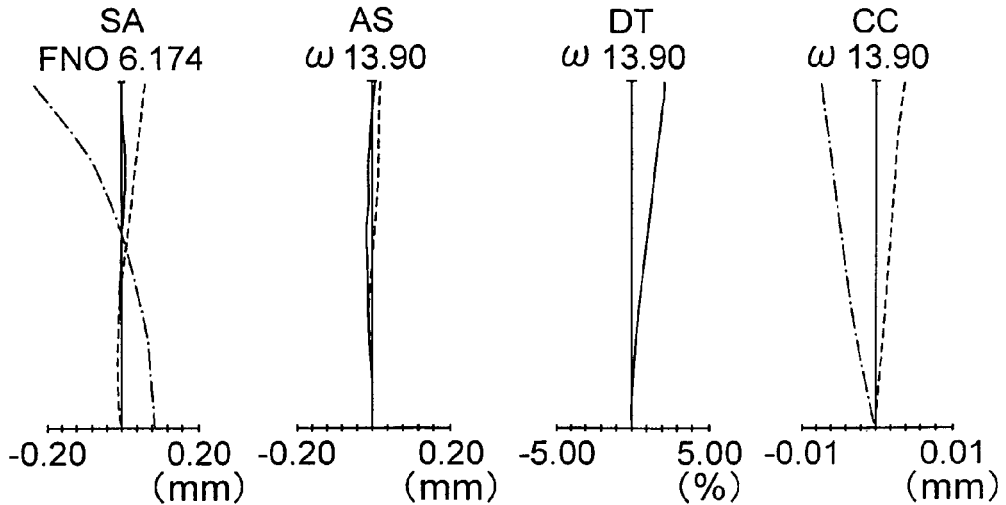
Figure 13A:
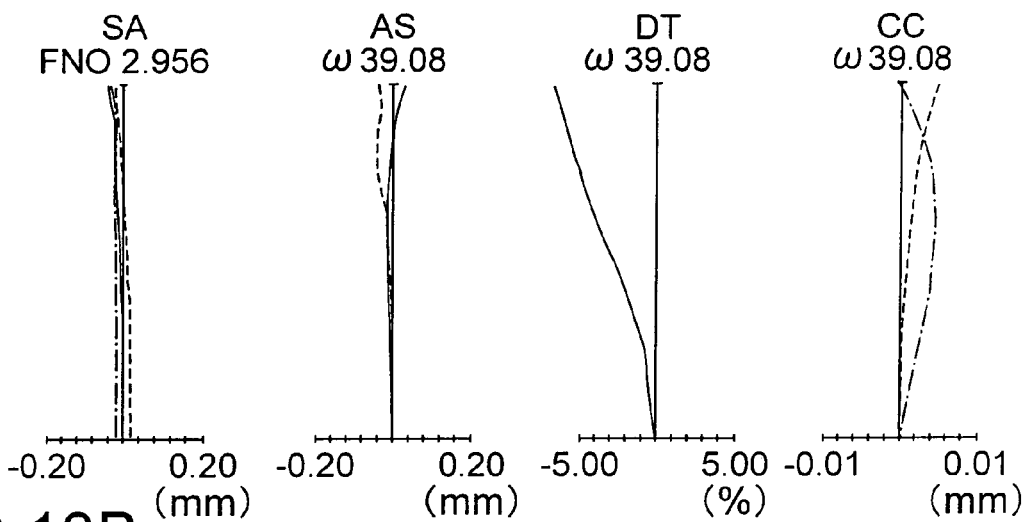
FIGS. 13A, 13B, and 13C are diagram similar to FIGS. 9A, 93, and 9C showing aberrations of the zoom lens according to the fifth embodiment in the state in which the zoom lens is focused on an object point at infinity.
Figure 13B:
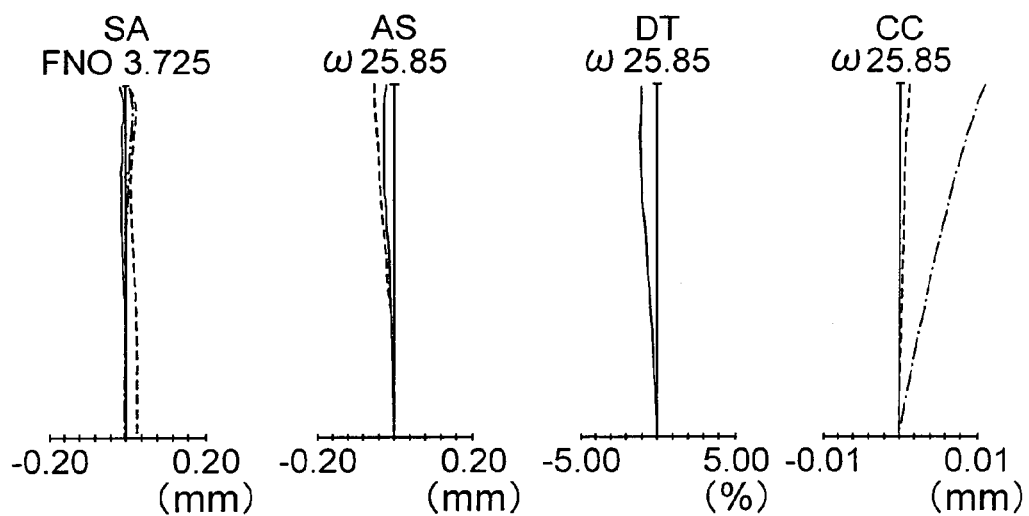
Figure 13C:
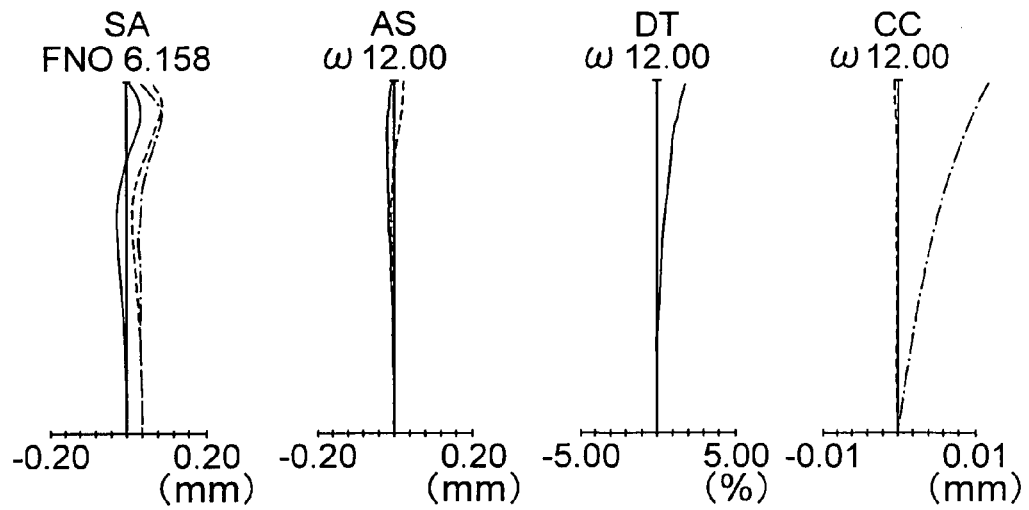
Figure 14A:
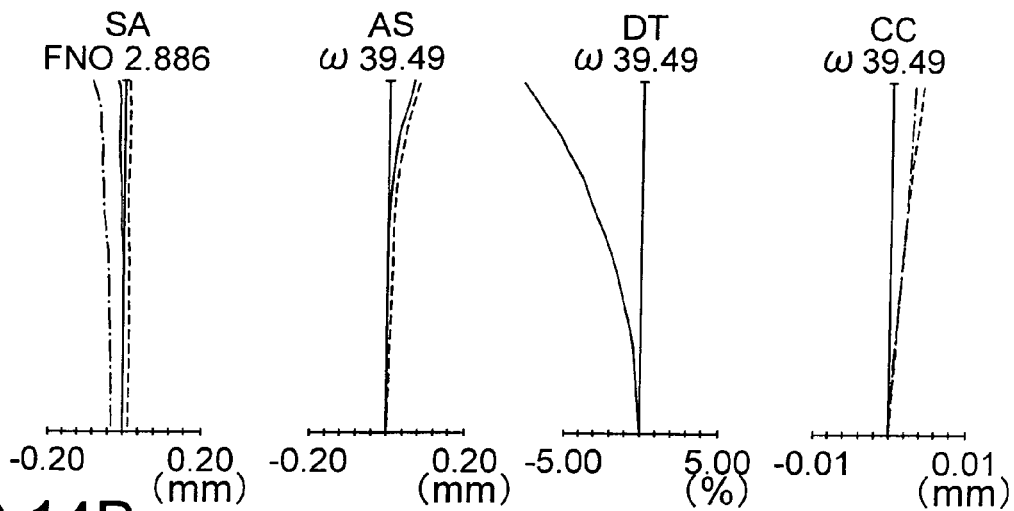
FIGS. 14A, 14B, and 14C are diagram similar to FIGS. 9A, 9B, and 9C showing aberrations of the zoom lens according to the sixth embodiment in the state in which the zoom lens is focused on an object point at infinity.
Figure 14B:
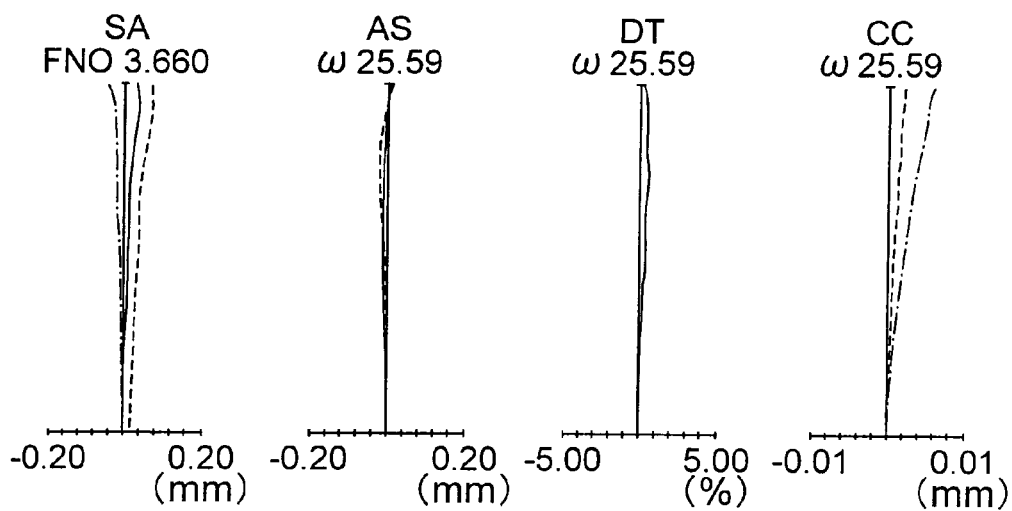
Figure 14C:
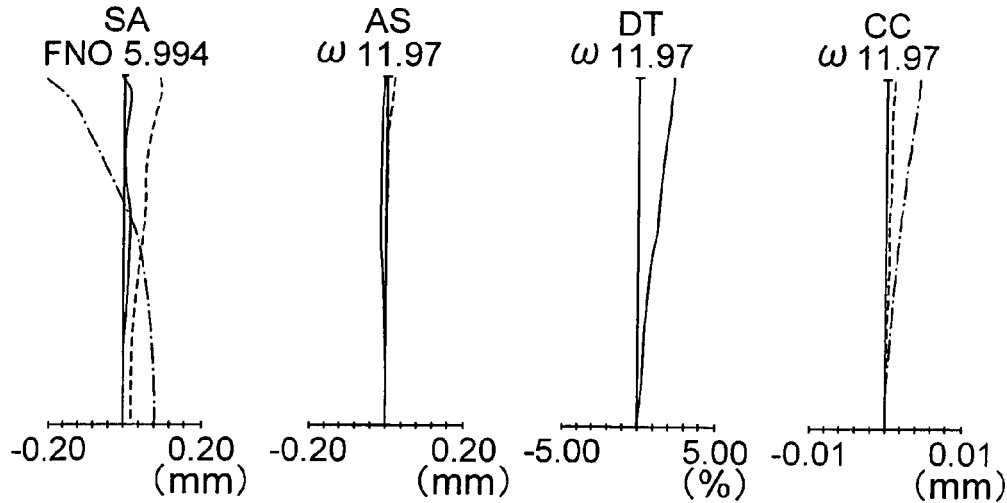
Figure 15A:
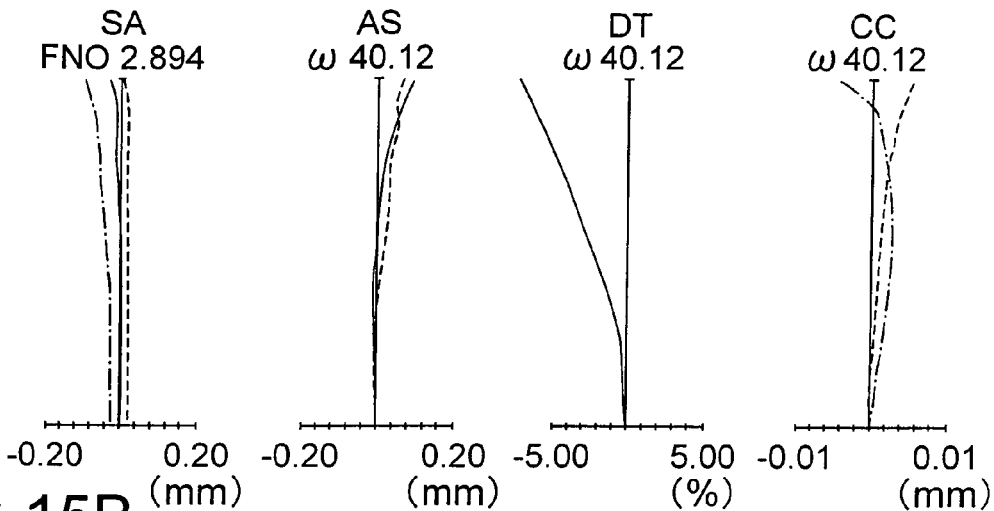
FIGS. 15A, 15B, and 15C are diagram similar to FIGS. 9A, 9B, and 9C showing aberrations of the zoom lens according to the seventh embodiment in the state in which the zoom lens is focused on an object point at infinity.
Figure 15B:
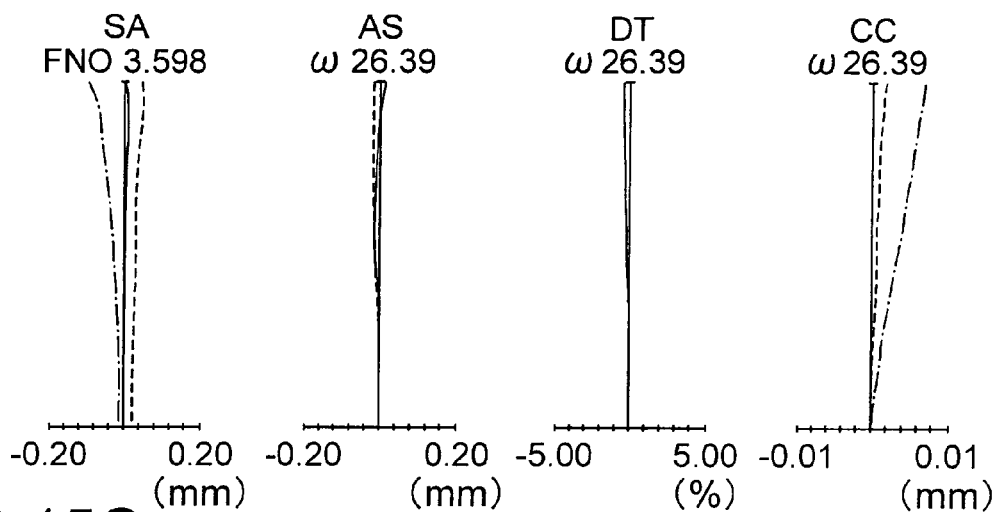
Figure 15C:
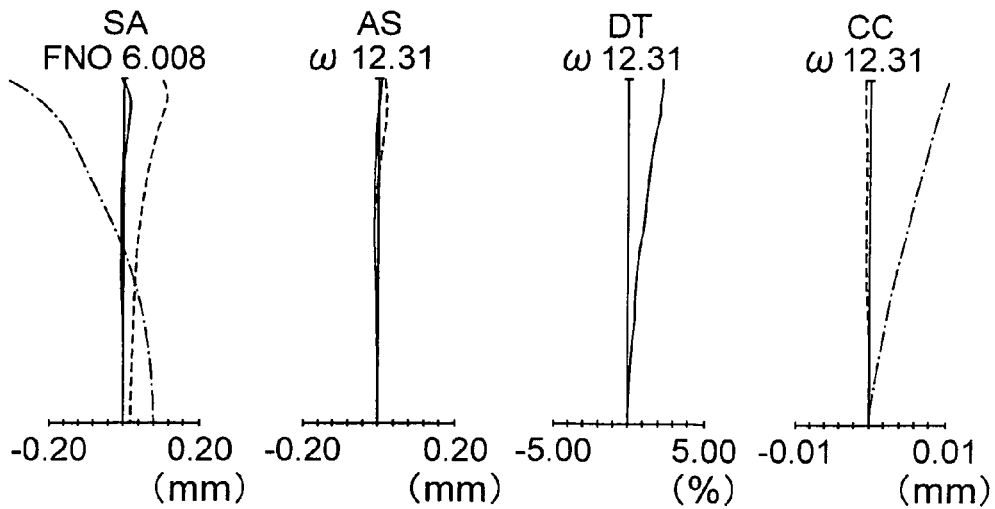
Figure 16A:
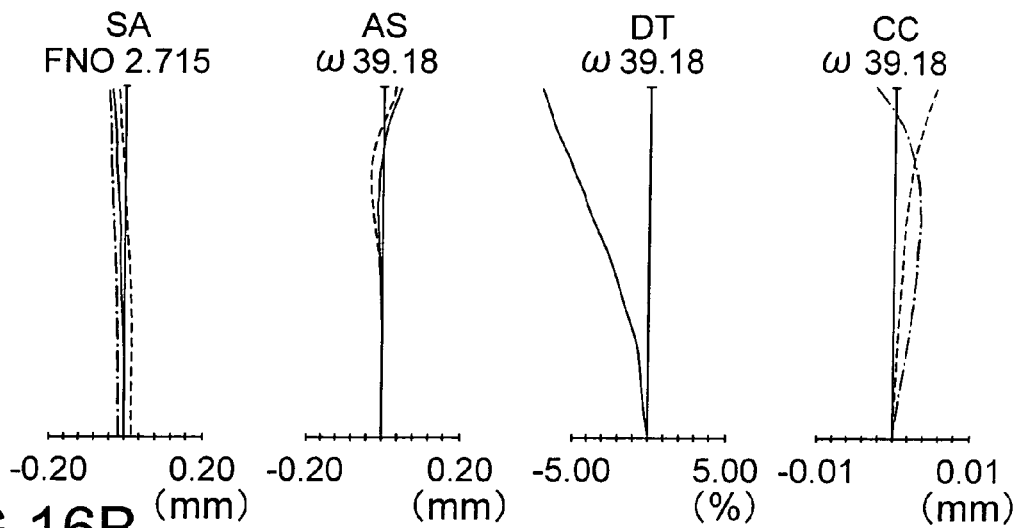
Figure 16B:
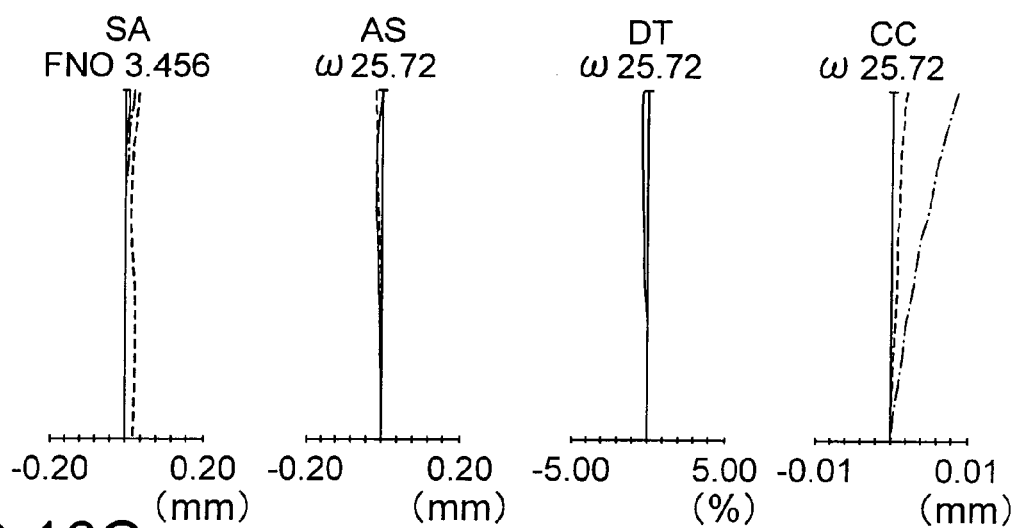
Figure 16C:
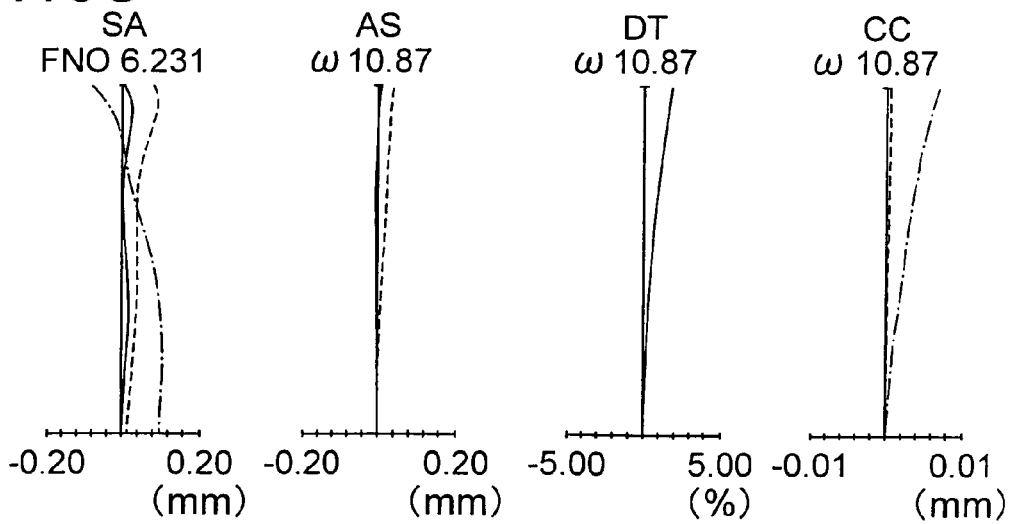

As shown in FIGS. 8A to 8C, the zoom lens according to the eighth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 moves first toward the image side and thereafter toward the object side, the second lens unit G2 moves only toward the object side, and the third lens unit moves only toward the image side.

The first lens unit G1 is composed, in order from the object side, a biconcave negative lens and a positive meniscus lens having a convex surface directed toward the object side. The second lens unit G2 is composed, in order from the object side, of a first biconvex positive lens, and a cemented lens composed of a second biconvex positive lens and a biconcave negative lens. The third lens unit G3 is composed, in order from the object side, of a negative meniscus lens having a convex surface directed toward the image side and a positive meniscus lens having a convex surface directed toward the image side.

The following seven lens surfaces are aspheric surfaces: both surfaces of the biconcave negative lens in the first lens unit G1, both surfaces of the biconvex positive lens in the second lens unit G2, the image side surface of the biconcave negative lens in the second lens unit G2, the object side surface of the negative meniscus lens having a convex surface directed toward the image side in the third lens unit G3, and the image side surface of the positive meniscus lens having a convex surface directed toward the image side in the third lens unit G3.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

Unit mm
Surface data

| Surface No. | r | d | nd | vd |
|---|---|---|---|---|
| 1* | −75.732 | 0.80 | 1.80610 | 40.92 |
| 2* | 6.159 | 2.19 | | |
| 3 | 8.286 | 1.26 | 1.92286 | 18.90 |
| 4 | 12.932 | Variable | | |
| 5(S) | ∞ | 0.00 | | |
| 6* | 4.218 | 1.58 | 1.58313 | 59.38 |
| 7* | −11.614 | 0.10 | | |
| 8 | 6.020 | 1.50 | 1.92286 | 18.90 |
| 9 | 2.854 | Variable | | |
| 10 | −10.000 | 0.80 | 1.52542 | 55.78 |
| 11 | −12.633 | 0.10 | | |
| 12 | 1570.615 | 1.68 | 1.52542 | 55.78 |
| 13* | −7.877 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |

Image plane (Image pick up plane)
Aspherical coefficients

1st surface

K = 0.000, A4 = 8.63164e−04, A6 = −1.44594e−05,
A8 = −1.79441e−07, A10 = 6.44702e−09

2nd surface

K = 0.604, A4 = 3.55946e−04, A6 = 8.82553e−06,
A8 = −1.63344e−06, A10 = −4.03670e−08

6th surface

K = −2.032, A4 = 9.55124e−04, A6 = −3.47908e−05,
A8 = −1.61349e−05, A10 = −2.39598e−06

7th surface

K = 0.000, A4 = −1.90243e−04, A6 = 5.16487e−05,
A8 = −3.86916e−05

13th surface

K = −4.289, A4 = −3.77823e−04, A6 = 6.57896e−06,
A8 = −1.39603e−07

Group focal length

| f1 = −11.20 | f2 = 8.59 | f3 = 16.71 |
|---|---|---|

Zoom data

| | WE | ST | TE |
|---|---|---|---|
| IH | 3.6 | 3.6 | 3.6 |
| Focal length | 4.63 | 7.32 | 16.22 |
| Fno. | 2.87 | 3.59 | 6.01 |
| 2ω(°) | 79.87 | 52.68 | 24.66 |
| BF | 4.51 | 4.35 | 3.65 |
| Total length | 29.73 | 26.69 | 29.66 |
| d4 | 12.70 | 6.97 | 1.60 |
| d9 | 2.50 | 5.36 | 14.40 |
| d13 | 2.86 | 2.70 | 2.00 |

Zoom data (When distortion is electrically corrected)

| | WE | ST | TE |
|---|---|---|---|
| Focal length | 4.63 | 7.32 | 16.22 |
| Fno. | 2.87 | 3.59 | 6.01 |
| 2ω(°) | 78.56 | 52.68 | 24.66 |
| IH | 3.52 | 3.6 | 3.6 |

EXAMPLE 2 unit mm

Surface data

| Surface No. | r | d | nd | vd |
|---|---|---|---|---|
| 1* | −31.515 | 0.80 | 1.80610 | 40.92 |
| 2* | 7.000 | 2.03 | | |
| 3 | 9.346 | 1.28 | 1.92286 | 18.90 |
| 4 | 16.817 | Variable | | |
| 5 (S) | ∞ | 0.50 | | |
| 6* | 4.597 | 1.74 | 1.58313 | 59.38 |
| 7* | −10.331 | 0.10 | | |
| 8 | 7.257 | 1.06 | 1.80400 | 46.57 |
| 9 | 13.104 | 0.50 | 1.80518 | 25.42 |
| 10 | 3.117 | Variable | | |
| 11 | −10.000 | 0.80 | 1.52542 | 55.78 |
| 12 | −15.879 | 0.10 | | |
| 13 | −61.608 | 1.61 | 1.52542 | 55.78 |
| 14* | −7.052 | Variable | | |
| 15 | ∞ | 0.50 | 1.54771 | 62.84 |
| 16 | ∞ | 0.50 | | |
| 17 | ∞ | 0.50 | 1.51633 | 64.14 |
| 18 | ∞ | 0.50 | | |
| Image plane (Image pick up plane) | | | | |

Aspherical coefficients

1st surface

K = 0.000, A4 = 1.28825e−03, A6 = −2.87635e−05,
A8 = 1.43822e−08, A10 = 5.28531e−09

2nd surface

K = 0.968, A4 = 7.51526e−04, A6 = 1.29461e−05,
A8 = −2.77211e−06, A10 = −7.88860e−11

6th surface

K = −2.315, A4 = 6.32399e−04, A6 = −7.60844e−05,
A8 = −1.44293e−05, A10 = −2.09939e−06

7th surface

K = 0.000, A4 = −3.71450e−04, A6 = −1.28789e−05,
A8 = −3.03992e−05

14th surface

K = −3.360, A4 = −3.71759e−04, A6 = 4.76797e−06,
A8 = −1.08593e−07

Group focal length

| f1 = −11.69 | f2 = 9.00 | f3 = 19.40 |
|---|---|---|

Zoom data

| | WE | ST | TE |
|---|---|---|---|
| IH | 3.6 | 3.6 | 3.6 |
| Focal length | 4.75 | 7.51 | 16.62 |
| Fno. | 2.88 | 3.53 | 5.85 |
| 2ω (°) | 78.82 | 51.47 | 23.93 |
| BF | 5.23 | 5.29 | 4.15 |
| Total length | 31.38 | 27.60 | 30.32 |
| d4 | 13.33 | 6.87 | 1.20 |
| d10 | 2.30 | 4.92 | 14.45 |
| d14 | 3.58 | 3.64 | 2.50 |

Zoom data (When distortion is electrically corrected)

| Focal length | 4.75 | 7.51 | 16.62 |
|---|---|---|---|
| Fno. | 2.88 | 3.53 | 5.85 |
| 2ω (°) | 77.16 | 51.47 | 23.93 |
| IH | 3.51 | 3.6 | 3.6 |

EXAMPLE 3 unit mm

Surface data

| Surface No. | r | d | nd | vd |
|---|---|---|---|---|
| 1* | −28.624 | 0.80 | 1.80610 | 40.92 |
| 2* | 7.102 | 1.51 | | |
| 3 | 8.465 | 1.25 | 1.92286 | 18.90 |
| 4 | 15.000 | Variable | | |
| 5 (S) | ∞ | 0.50 | | |
| 6* | 4.584 | 1.68 | 1.58313 | 59.38 |
| 7* | −15.102 | 0.10 | | |
| 8 | 6.386 | 1.20 | 1.80610 | 40.92 |
| 9 | 22.010 | 0.50 | 1.80518 | 25.42 |
| 10 | 3.040 | Variable | | |
| 11* | −13.000 | 0.80 | 1.52542 | 55.78 |
| 12 | −12.693 | 0.10 | | |
| 13 | −23.585 | 2.02 | 1.52542 | 55.78 |
| 14* | −6.191 | Variable | | |
| 15 | ∞ | 0.50 | 1.54771 | 62.84 |
| 16 | ∞ | 0.50 | | |
| 17 | ∞ | 0.50 | 1.51633 | 64.14 |
| 18 | ∞ | 0.32 | | |
| Image plane (Image pick up plane) | | | | |

Aspherical coefficients

1st surface

K = 0.000, A4 = 9.65210e−04, A6 = −1.84232e−05, A8 = 1.54796e−07

2nd surface

K = 0.775, A4 = 6.83359e−04, A6 = −1.28637e−05, A8 = 2.06468e−07,
A10 = −3.45662e−08

6th surface

K = −1.904, A4 = 1.02323e−03, A6 = 5.25597e−07, A8 = −4.66818e−06,
A10 = −7.03594e−08

7th surface

K = 0.000, A4 = 2.16799e−04, A6 = 2.80625e−05, A8 = −7.06696e−06

11th surface

K = 0.000, A4 = −1.21144e−03, A6 = 4.31564e−05

14th surface

K = −1.253, A4 = −7.50374e−04, A6 = 2.86564e−05,
A8 = −3.30381e−09

Group focal length

| f1 = −11.75 | f2 = 9.13 | f3 = 14.68 |
|---|---|---|

Zoom data

| | WE | ST | TE |
|---|---|---|---|
| IH | 3.6 | 3.6 | 3.6 |
| Focal length | 5.08 | 8.03 | 19.71 |
| Fno. | 2.69 | 3.49 | 6.22 |
| 2ω (°) | 78.29 | 51.65 | 21.69 |
| BF | 4.90 | 4.11 | 3.97 |
| Total length | 30.11 | 28.53 | 34.15 |
| d4 | 12.17 | 7.34 | 1.30 |
| d10 | 2.60 | 6.63 | 18.43 |
| d14 | 3.43 | 2.64 | 2.50 |

Zoom data (When distortion is electrically corrected)

| Focal length | 5.08 | 8.03 | 19.71 |
|---|---|---|---|
| Fno. | 2.69 | 3.49 | 6.22 |
| 2ω (°) | 77.16 | 51.65 | 21.69 |
| IH | 3.53 | 3.6 | 3.6 |

EXAMPLE 4 unit mm

Surface data

| Surface No. | r | d | nd | vd |
|---|---|---|---|---|
| 1* | −57.999 | 0.80 | 1.85135 | 40.10 |
| 2* | 6.200 | 2.50 | | |
| 3* | 11.815 | 1.19 | 2.10225 | 16.80 |
| 4 | 18.266 | Variable | | |
| 5 (S) | ∞ | 0.00 | | |
| 6* | 4.296 | 2.27 | 1.54969 | 71.75 |
| 7* | −9.050 | 0.10 | | |
| 8 | 5.495 | 1.35 | 1.92286 | 20.88 |
| 9 | 2.856 | Variable | | |
| 10 | −10.000 | 0.80 | 1.52542 | 55.78 |
| 11 | −11.124 | 0.16 | | |
| 12 | −15.000 | 1.68 | 1.58313 | 59.38 |
| 13* | −5.592 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image plane (Image pick up plane) | | | | |

Aspherical coefficients

1st surface

K = 0.000, A4 = 1.48620e−03, A6 = −3.26084e−05, A8 = −1.55682e−07, A10 = 7.46342e−09

2nd surface

K = 0.392, A4 = 1.55710e−03, A6 = 1.17426e−05, A8 = −2.92298e−07, A10 = −1.27276e−07

3rd surface

K = 0.000, A4 = 2.81277e−04, A6 = 2.02191e−07, A8 = 0.000, A10 = 2.1004e−08, A12 = 2.0141e−09, A14 = −1.39554e−10

6th surface

K = −2.195, A4 = 1.00603e−03, A6 = −1.08685e−04, A8 = 1.06757e−06, A10 = −1.49012e−06

7th surface

K = 0.000, A4 = 1.64463e−04, A6 = −4.05406e−05, A8 = −1.34042e−05

13th surface

K = −1.481, A4 = 1.97334e−04, A6 = −1.36749e−05, A8 = 1.20016e−07

Group focal length

| f1 = −9.27 | f2 = 8.04 | f3 = 14.68 |
|---|---|---|

| | WE | ST | TE |
|---|---|---|---|

Zoom data

| | WE | ST | TE |
|---|---|---|---|
| IH | 3.85 | 3.85 | 3.85 |
| Focal length | 4.07 | 6.43 | 14.25 |
| Fno. | 2.96 | 3.68 | 6.17 |
| 2ω (°) | 87.82 | 58.31 | 27.79 |
| BF | 4.39 | 4.50 | 4.15 |
| Total length | 29.18 | 26.52 | 30.31 |
| d4 | 11.65 | 6.36 | 1.60 |
| d9 | 2.30 | 4.83 | 13.74 |
| d13 | 2.74 | 2.85 | 2.49 |

Zoom data (When distortion is electrically corrected)

| Focal length | 4.07 | 6.43 | 14.25 |
|---|---|---|---|
| Fno. | 2.96 | 3.68 | 6.17 |
| 2ω (°) | 85.92 | 58.31 | 27.79 |
| IH | 3.75 | 3.85 | 3.85 |

EXAMPLE 5 unit mm

Surface data

| Surface No. | r | d | nd | vd |
|---|---|---|---|---|
| 1* | −40.267 | 0.75 | 1.80610 | 40.92 |
| 2* | 6.106 | 1.88 | | |
| 3 | 8.717 | 1.35 | 1.92286 | 18.90 |
| 4 | 16.000 | Variable | | |
| 5 (S) | ∞ | 0.00 | | |
| 6* | 3.893 | 1.77 | 1.55606 | 64.53 |
| 7* | −21.375 | 0.10 | | |
| 8 | 6.044 | 1.50 | 2.10225 | 16.80 |
| 9* | 3.352 | Variable | | |
| 10* | −10.000 | 0.80 | 1.52542 | 55.78 |
| 11 | −12.572 | 0.10 | | |
| 12 | −34.726 | 1.57 | 1.52542 | 55.78 |
| 13* | −7.254 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image plane (Image pick up plane) | | | | |

Aspherical coefficients

1st surface

K = 0.000, A4 = 9.53870e−04 A6 = −1.82491e−05, A8 = 9.03444e−09, A10 = 2.97648e−09

2nd surface

K = 0.480, A4 = 4.91521e−04, A6 = −3.93247e−06, A8 = −7.50240e−07, A10 = −4.68586e−08

6th surface

K = −1.448, A4 = 1.68446e−03, A6 = 5.28303e−06, A8 = −1.50101e−05, A10 = 1.40900e−06

7th surface

K = 0.000, A4 = −7.33600e−04, A6 = 1.21720e−05, A8 = 1.45238e−06

9th surface

K = 0.000, A4 = 3.00679e−03, A6 = 3.47555e−04

10th surface

K = 0.000, A4 = −3.33530e−04, A6 = 5.44978e−05

13th surface

K = −0.522, A4 = 8.89558e−05, A6 = 3.35121e−05, A8 = 2.97775e−07

Group focal length

| f1 = −10.95 | f2 = 8.46 | f3 = 19.53 |
|---|---|---|

| | WE | ST | TE |
|---|---|---|---|

Zoom data

| | WE | ST | TE |
|---|---|---|---|
| IH | 3.6 | 3.6 | 3.6 |
| Focal length | 4.75 | 7.51 | 16.63 |
| Fno. | 2.96 | 3.72 | 6.16 |
| 2ω (°) | 78.16 | 51.71 | 24.00 |
| BF | 4.89 | 4.45 | 4.15 |
| Total length | 29.60 | 26.79 | 29.65 |
| d4 | 12.60 | 7.11 | 1.60 |
| d9 | 2.30 | 5.41 | 14.09 |
| d13 | 3.24 | 2.80 | 2.50 |

Zoom data (When distortion is electrically corrected)

| Focal length | 4.75 | 7.51 | 16.63 |
|---|---|---|---|
| Fno. | 2.96 | 3.72 | 6.16 |
| 2ω (°) | 77.17 | 51.71 | 24.00 |
| IH | 3.54 | 3.6 | 3.6 |

EXAMPLE 6 unit mm

Surface data

| Surface No. | r | d | nd | νd |
|---|---|---|---|---|
| 1 | 363.766 | 0.75 | 1.80610 | 40.92 |
| 2* | 6.000 | 2.04 | | |
| 3 | 8.428 | 1.28 | 1.92286 | 18.90 |
| 4 | 13.000 | Variable | | |
| 5 (S) | ∞ | 0.00 | | |
| 6* | 4.091 | 1.54 | 1.58313 | 59.38 |
| 7* | −13.846 | 0.10 | | |
| 8 | 5.213 | 1.34 | 1.92286 | 18.90 |
| 9 | 2.640 | Variable | | |
| 10 | −9.034 | 0.80 | 1.52542 | 55.78 |
| 11 | −11.000 | 0.10 | | |
| 12 | −28.356 | 1.69 | 1.52542 | 55.78 |
| 13* | −6.084 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image plane (Image pick up plane) | | | | |

Aspherical coefficients

2nd surface $K = -0.312, A_4 = -9.90285e-05, A_6 = -3.85629e-06, A_8 = 7.70198e-08, A_{10} = -3.18495e-09$ 6th surface $K = -1.917, A_4 = 7.66948e-04, A_6 = -1.21977e-04, A_8 = -1.62327e-05, A_{10} = -6.92312e-06$ 7th surface $K = 0.000, A_4 = -9.09506e-04, A_6 = -1.35015e-05, A_8 = -6.43215e-05$ 13th surface $K = -3.163, A_4 = -6.05348e-04, A_6 = 7.34462e-06, A_8 = -1.16607e-07$

Group focal length

| f1 = −12.07 | f2 = 8.82 | f3 = 15.70 |
|---|---|---|

Zoom data

| | WE | ST | TE |
|---|---|---|---|
| IH | 3.6 | 3.6 | 3.6 |
| Focal length | 4.75 | 7.50 | 16.61 |
| Fno. | 2.89 | 3.66 | 5.99 |
| 2ω (°) | 78.98 | 51.17 | 23.94 |
| BF | 4.88 | 4.30 | 4.15 |
| Total length | 30.15 | 27.23 | 29.51 |
| d4 | 13.33 | 7.67 | 1.60 |
| d9 | 2.30 | 5.62 | 14.12 |
| d13 | 3.23 | 2.65 | 2.50 |

Zoom data (When distortion is electrically corrected)

| | WE | ST | TE |
|---|---|---|---|
| Focal length | 4.75 | 7.51 | 16.63 |
| Fno. | 2.96 | 3.72 | 6.16 |
| 2ω (°) | 77.20 | 51.71 | 24.00 |
| IH | 3.50 | 3.6 | 3.6 |

EXAMPLE 7 unit mm

Surface data

| Surface No. | r | d | nd | νd |
|---|---|---|---|---|
| 1* | −101.960 | 0.80 | 1.80610 | 40.92 |
| 2* | 6.026 | 2.24 | | |
| 3 | 7.927 | 1.25 | 1.92286 | 18.90 |
| 4 | 11.714 | Variable | | |
| 5 (S) | ∞ | 0.00 | | |
| 6* | 4.320 | 1.61 | 1.58313 | 59.38 |
| 7* | −11.280 | 0.10 | | |
| 8 | 5.926 | 1.50 | 1.92286 | 18.90 |
| 9 | 2.876 | Variable | | |
| 10 | −10.000 | 0.80 | 1.49700 | 81.61 |
| 11 | −11.321 | 0.10 | | |
| 12 | −44.614 | 1.56 | 1.49700 | 81.61 |
| 13* | −7.436 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image plane (Image pick up plane) | | | | |

Aspherical coefficients

1st surface $K = 0.000, A_4 = 9.19304e-04, A_6 = -1.59914e-05, A_8 = -2.00653e-07, A_{10} = 7.26801e-09$ 2nd surface $K = 0.576, A_4 = 4.20396e-04, A_6 = 1.23717e-05, A_8 = -1.88963e-06, A_{10} = -4.69727e-08$ 6th surface $K = -2.144, A_4 = 8.73053e-04, A_6 = -4.28150e-05, A_8 = -1.50232e-05, A_{10} = -2.57889e-06$ 7th surface $K = 0.000, A_4 = -3.19558e-04, A_6 = 5.83092e-05, A_8 = -3.97480e-05$ 13th surface $K = -6.150, A_4 = -1.04910e-03, A_6 = 4.05974e-05, A_8 = -8.82329e-07$

Group focal length

| f1 = −10.90 | f2 = 8.47 | f3 = 18.63 |
|---|---|---|

Zoom data

| | WE | ST | TE |
|---|---|---|---|
| IH | 3.6 | 3.6 | 3.6 |
| Focal length | 4.61 | 7.29 | 16.14 |
| Fno. | 2.89 | 3.60 | 6.01 |
| 2ω (°) | 80.24 | 52.78 | 24.62 |
| BF | 4.74 | 4.74 | 4.15 |
| Total length | 29.73 | 26.56 | 29.68 |
| d4 | 12.71 | 6.91 | 1.60 |
| d9 | 2.30 | 4.94 | 13.95 |
| d13 | 3.09 | 3.08 | 2.50 |

Zoom data (When distortion is electrically corrected)

| | WE | ST | TE |
|---|---|---|---|
| Focal length | 4.75 | 7.51 | 16.63 |
| Fno. | 2.96 | 3.72 | 6.16 |
| 2ω (°) | 78.83 | 51.71 | 24.00 |
| IH | 3.52 | 3.6 | 3.6 |

EXAMPLE 8

Surface data unit mm

| Surface No. | r | d | nd | vd |
|---|---|---|---|---|
| 1* | −58.855 | 0.80 | 1.80610 | 40.92 |
| 2* | 6.277 | 2.16 | | |
| 3 | 9.471 | 1.17 | 1.92286 | 18.90 |
| 4 | 17.000 | Variable | | |
| 5 (S) | ∞ | 0.60 | | |
| 6* | 4.351 | 1.82 | 1.58313 | 59.38 |
| 7* | −20.893 | 0.10 | | |
| 8 | 7.239 | 1.49 | 1.81600 | 46.62 |
| 9 | −9.912 | 0.51 | 1.90366 | 31.31 |
| 10* | 3.664 | Variable | | |
| 11* | −13.918 | 0.80 | 1.52542 | 55.78 |
| 12 | −14.157 | 0.10 | | |
| 13 | −28.285 | 1.75 | 1.52542 | 55.78 |
| 14* | −7.381 | Variable | | |
| 15 | ∞ | 0.50 | 1.54771 | 62.84 |
| 16 | ∞ | 0.50 | | |
| 17 | ∞ | 0.50 | 1.51633 | 64.14 |
| 18 | ∞ | 0.32 | | |
| Image plane (Image pick up plane) | | | | |

Aspherical coefficients

1st surface

K = 0.000, A4 = 4.44012e−04, A6 = −6.81498e−06, A8 = 5.22166e−08

2nd surface

K = −1.079, A4 = 7.59676e−04, A6 = 3.19513e−06

6th surface

K = −1.617, A4 = 1.55861e−03, A6 = −3.53530e−06

7th surface

K = 0.000, A4 = −8.59697e−05, A6 = 3.53598e−05, A8 = −1.81923e−06

10th surface

K = 0.000, A4 = 2.43339e−03, A6 = 9.59757e−05, A8 = 3.89963e−05

11th surface

K = 0.000, A4 = −4.22139e−04, A6 = 1.92221e−05

14th surface

K = −1.578, A4 = −1.73317e−04, A6 = 8.80572e−06, A8 = 7.74930e−08

Zoom data

| | WE | ST | TE |
|---|---|---|---|
| IH | 3.6 | 3.6 | 3.6 |
| Focal length | 5.08 | 8.03 | 19.71 |
| Fno. | 2.71 | 3.46 | 6.23 |
| 2ω (°) | 78.36 | 51.44 | 21.73 |
| BF | 4.94 | 4.42 | 3.97 |
| Total length | 31.86 | 29.41 | 34.65 |
| d4 | 13.00 | 7.46 | 1.30 |
| d10 | 2.60 | 6.23 | 18.07 |
| d14 | 3.47 | 2.94 | 2.50 |

Group focal length

| f1 = −11.54 | f2 = 9.26 | f3 = 18.09 |
|---|---|---|

Zoom data (When distortion is electrically corrected)

| | WE | ST | TE |
|---|---|---|---|
| Focal length | 4.75 | 7.51 | 16.63 |
| Fno. | 2.96 | 3.72 | 6.16 |
| 2ω (°) | 77.16 | 51.71 | 24.00 |
| IH | 3.52 | 3.6 | 3.6 |

FIGS. 9A through 16C are aberration diagrams of the zoom lenses according to the first to the eighth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 9A to 16A, in the intermediate focal length state in FIGS. 9B to 16B, and at the telephoto end in FIGS. 9C to 16C.

Values of the conditions of each of embodiments are shown below:

| | Example 1 | Example 2 | Example 3 | Example 4 |
|---|---|---|---|---|
| $(R_{2F} + R_{2R})/(R_{2F} - R_{2R})$ | 5.185539 | 4.939113 | 5.212036 | 4.965785 |
| $(R_{3F} + R_{3R})/(R_{3F} - R_{3R})$ | 8.418847 | 2.818227 | 5.783173 | 3.537121 |
| $(R_{1F} + R_{2R})/(R_{1F} - R_{2R})$ | 0.708286 | 0.312301 | 0.304093 | 0.52098 |
| $D_{12}/f_W$ | 2.740741 | 2.49317 | 2.911911 | 2.862238 |
| $T_{2F}/f_W$ | −0.57821 | −0.55624 | −0.61719 | −0.593 |
| $f_{3FF}/f_{3FR}$ | −0.79156 | −1.02415 | −0.62977 | −0.899 |
| $f_{1F}/f_W$ | −1.51838 | −1.48216 | −1.37574 | −1.60732 |
| $f_{1R}/f_W$ | 4.77198 | 4.43364 | 3.79665 | 6.80152 |
| $N_t$ | 6 | 7 | 7 | 6 |
| $n_{2pave}$ | 1.58313 | 1.693565 | 1.694615 | 1.54969 |
| $v_{2n}$ | 18.9 | 25.42 | 25.42 | 20.88 |
| $n_{3ave}$ | 1.52542 | 1.52542 | 1.52542 | 1.554275 |
| $v_{3ave}$ | 55.7771 | 55.7771 | 55.7771 | 57.57855 |
| $y_{07}/(f_W \cdot \tan\omega_{07W})$ | 0.980239 | 0.942645 | 0.930925 | 0.960465 |
| $(R_{2R} + R_{3F})/(R_{2R} - R_{3F})$ | −0.55592 | −0.52477 | −0.62092 | −0.55571 |
| $(R_{3FR} + R_{3RF})/(R_{3FR} - R_{3RF})$ | −0.98404 | −1.69447 | −3.3308 | −6.73898 |
| $(R_{3RF} + R_{3R})/(R_{3RF} - R_{3R})$ | 0.99002 | 1.258504 | 1.711769 | 2.188748 |
| $(R_{1F} + R_{1FR})/(R_{1F} - R_{1FR})$ | 0.849576 | 0.636506 | 0.636506 | 0.80685 |
| Zooming ratio | 3.5 | 3.5 | 3.88 | 3.5 |
| $\omega_{07w}$ (°) | 29.02295 | 29.37106 | 29.67779 | 32.80801 |

| | Example 5 | Example 6 | Example 7 | Example 8 |
|---|---|---|---|---|
| $(R_{2F} + R_{2R})/(R_{2F} - R_{2R})$ | 13.39155 | 4.639941 | 4.984171 | 11.66804 |
| $(R_{3F} + R_{3R})/(R_{3F} - R_{3R})$ | 6.283362 | 5.124274 | 6.800855 | 3.257963 |
| $(R_{1F} + R_{2R})/(R_{1F} - R_{2R})$ | 0.431284 | 1.014621 | 0.793904 | 0.551778 |
| $D_{12}/f_W$ | 2.652638 | 2.807932 | 2.756339 | 2.908675 |
| $T_{2F}/f_W$ | −0.581 | −0.61533 | −0.59716 | −0.68372 |
| $f_{3FF}/f_{3FR}$ | −0.7954 | −1.48493 | −0.88328 | −0.98317 |
| $f_{1F}/f_W$ | −1.37477 | −1.59581 | −1.52561 | −1.37751 |
| $f_{1R}/f_W$ | 4.01257 | 4.82112 | 4.97151 | 4.24424 |
| $N_t$ | 6 | 6 | 6 | 7 |
| $n_{2pave}$ | 1.55606 | 1.58313 | 1.58313 | 1.699565 |
| $v_{2n}$ | 16.8 | 18.9 | 18.9 | 31.31 |
| $n_{3ave}$ | 1.52542 | 1.52542 | 1.497 | 1.52542 |
| $v_{3ave}$ | 55.7771 | 55.7771 | 81.61 | 55.7771 |
| $y_{07}/(f_w \cdot \tan\omega_{07w})$ | 0.951067 | 0.961141 | 0.954629 | 0.953373 |
| $(R_{2R} + R_{3F})/(R_{2R} - R_{3F})$ | −0.49791 | −0.54773 | −0.55323 | −0.58325 |
| $(R_{3FR} + R_{3RF})/(R_{3FR} - R_{3RF})$ | −2.13502 | −2.2676 | −1.68013 | −3.00393 |
| $(R_{3RF} + R_{3R})/(R_{3RF} - R_{3R})$ | 1.528111 | 1.546348 | 1.400035 | 1.70614 |
| $(R_{1F} + R_{1FR})/(R_{1F} - R_{1FR})$ | 0.73666 | 1.033541 | 0.888397 | 0.807262 |
| Zooming ratio | 3.5 | 3.5 | 3.5 | 3.88 |
| $\omega_{07w}$ (°) | 29.15364 | 28.91341 | 29.79002 | 29.09408 |

(Correction of Distortion)

Incidentally, when the zoom lens system of the present invention is used, a digital correction of distortion of an image is carried out electrically. A basic concept for the digital correction of the distortion of an image will be described below.

Figure 17:
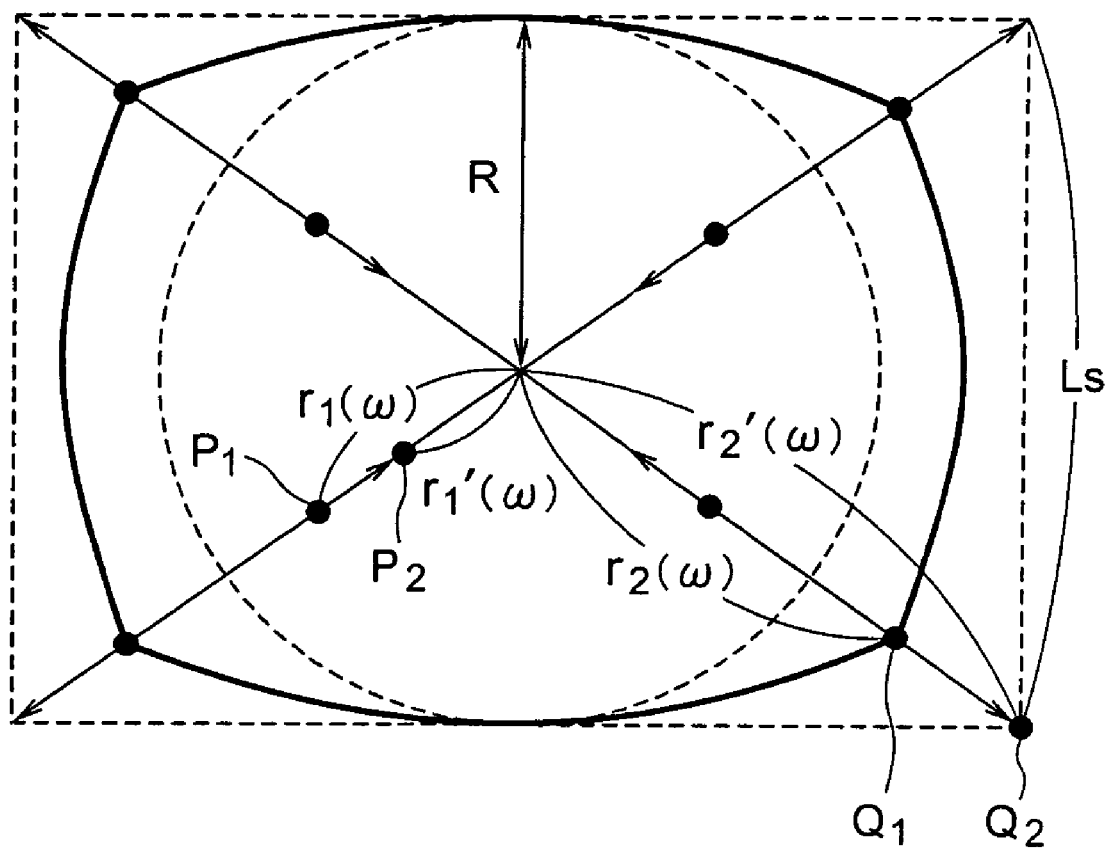
FIG. 17 is a diagram illustrating correction of distortion.

For example, as shown in FIG. 17, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 17, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \cdot \tan \omega \ (0 \leq \alpha \leq 1)$$

where, ω is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of ω becomes large.

(Digital Camera)

Figure 18:
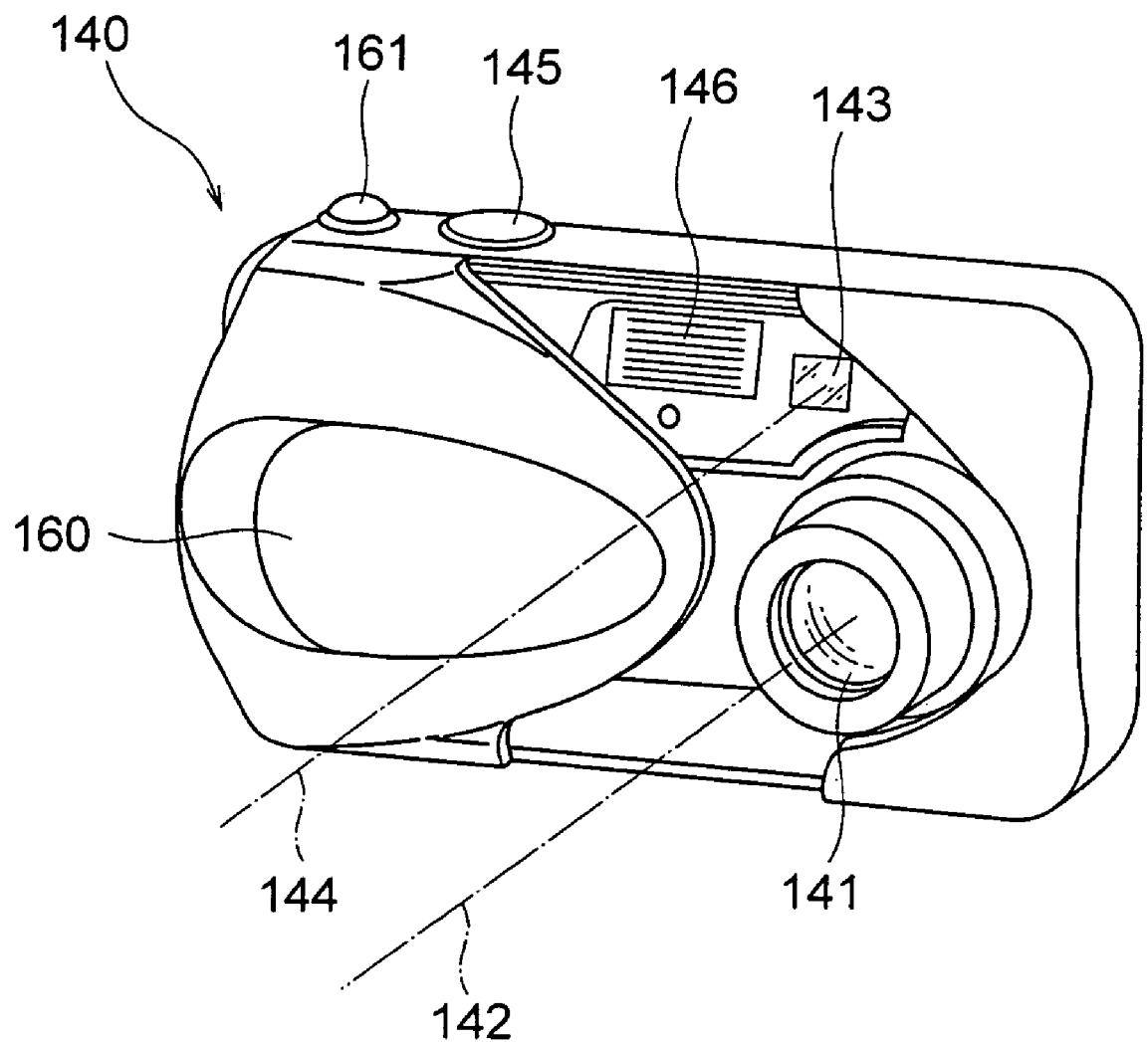
FIG. 18 is a front perspective view showing an outer appearance of a digital camera equipped with a zoom lens according to the present invention.
Figure 19:
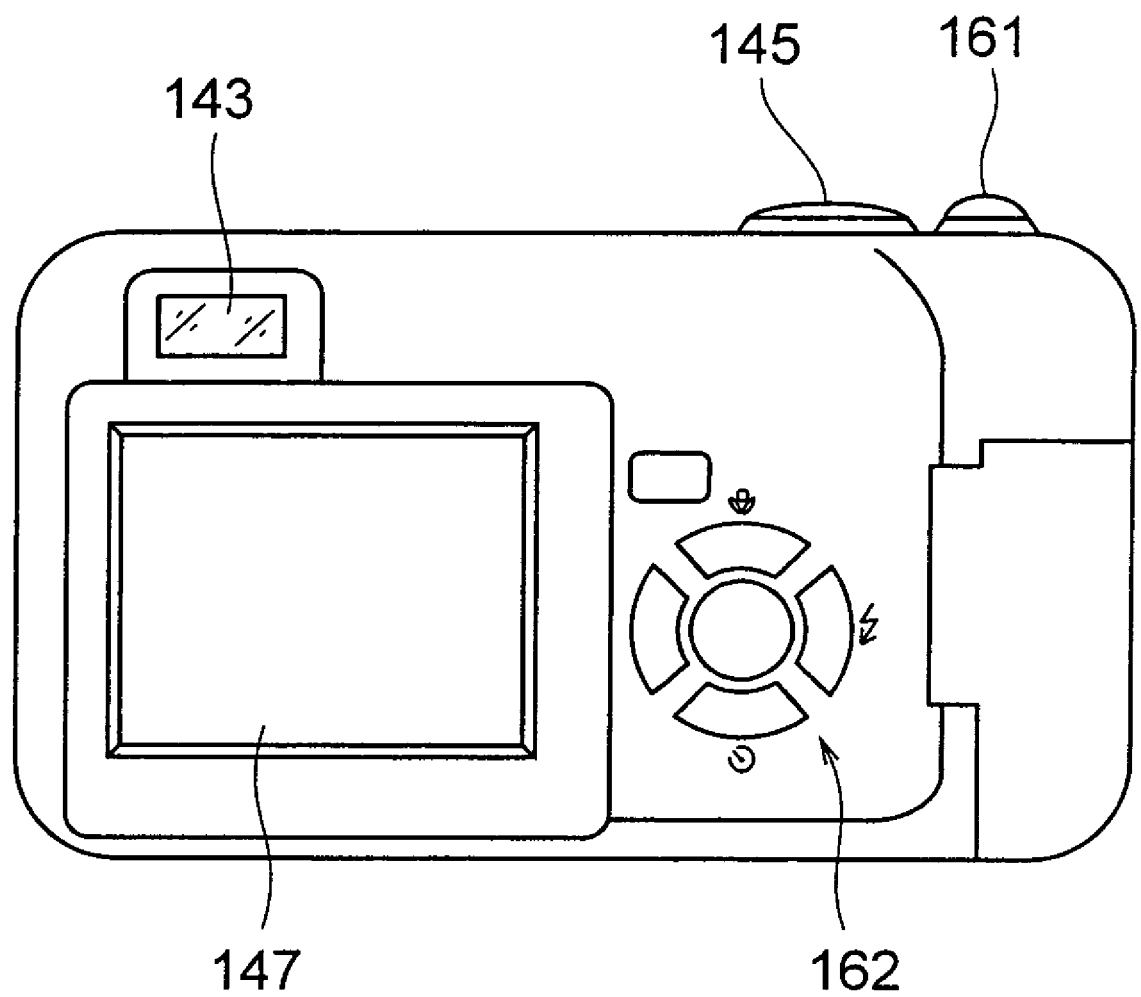
FIG. 19 is a rear view of the digital camera.

FIG. 18 to FIG. 20 are conceptual diagrams of a structure of a digital camera according to the present invention in which a zoom lens system described above is incorporated in a taking optical system 141. FIG. 18 is a front perspective view showing an appearance of a digital camera 140, FIG. 19 is a rear perspective view of the same, and FIG. 20 is a schematic cross-sectional view showing a structure of the digital camera 140. In FIG. 18 and FIG. 20, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 18, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

FIG. 21 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 21, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

Besides the above described modes of the present invention, there may be other modes of the present invention as appended below.

(Appended Mode 1)

In the three unit zoom lens as recited in any one of claims 1 to 25, the first lens unit may be composed of two lens components including, in order from the object side, a front lens component having an object side lens surface concave toward the object side and having a negative refracting power and a rear lens component having a positive refracting power.

With this configuration, a principal point of the first lens unit is located closer to the object side, which is advantageous in reducing the size of the first lens unit with respect to the diametrical direction. In addition, this configuration facilitates correction of aberrations such as chromatic aberration and curvature of field.

In this configuration, since the lens surface closest to the object side in the first lens unit is concave at least in the vicinity of the optical axis. Thus, this concave surface also shares the negative refracting power of the first lens unit, which facilitates a reduction of spherical aberration at zoom positions near the telephoto end at which the diameter of on-axis beams tends to be large and provides advantages in achieving an adequate lens speed and in increasing the zoom ratio.

In addition, this configuration makes the lens arrangement of the composite system of the first lens unit and the second lens unit symmetrical, which facilitates a reduction of aberrations such as spherical aberration and curvature of field at the telephoto end.

(Appended Mode 2)

In the three unit zoom lens according to appended mode 1, the first lens unit and the second lens unit may satisfy the following condition:

$$0.1 < (R_{1F} + R_{2R})/(R_{1F} - R_{2R}) < 1.0 \quad (3)$$

where, $R_{1F}$ is the paraxial radius of curvature of the lens surface closest to the object side in the first lens unit, and $R_{2R}$ is the paraxial radius of curvature of the lens surface closest to the image side in the second lens unit.

Conditional expression (3) specifies more preferred shapes of the lens surface closest to the object side in the first lens unit and the lens surface closest to the image side in the second lens unit.

Making the negative refracting power of the lens surface closest to the object side in the first lens unit moderately small facilitates a reduction in aberrations such as coma and distortion at zoom positions near the wide angle end.

If the lower limit of conditional expression (3) is not exceeded so that the paraxial radius of curvature of the lens surface closest to the object side is made moderately small, generation of unduly large distortion at zoom positions near the wide angle end can easily be prevented.

If the upper limit of conditional expression (3) is not exceeded so that the lens surface closest to the object side has an adequate negative refracting power, a reduction in the Petzval sum and spherical aberration is facilitated.

(Appended Mode 3)

In the three unit zoom lens according to appended mode 1 or 2, the front lens component in the first lens unit may be a biconcave lens component that satisfy the following condition:

$$0.4 < (R_{1F} + R_{1FR})/(R_{1F} - R_{1FR}) < 1.1 \quad (D)$$

where, $R_{1F}$ is the paraxial radius of curvature of the lens surface closest to the object side in the first lens unit, and $R_{1FR}$ is the paraxial radius of curvature of the image side lens surface of the front side lens component in the first lens unit.

If the front lens component in the first lens unit is a negative lens having an object side surface that has a weak positive refracting power or a lens having a biconcave shape, the negative refracting power of its image side surface can be made smaller, which is advantageous in reducing spherical aberration generated in the first lens unit.

Conditional expression (D) specifies preferred shapes of the lens component taking into account influence on off-axis aberrations.

If the lower limit of conditional expression (D) is not exceeded, the image side lens surface of this lens component has an adequate negative refracting power, and a reduction in spherical aberration is facilitated. Furthermore, a reduction in the absolute value of the curvature of the object side lens surface thereof is also facilitated, which is advantageous in correcting coma etc. at zoom positions near the wide angle end.

If the upper limit of conditional expression (D) is not exceeded so that negative refracting power of the image side lens surface can easily be made small, a reduction in spherical aberrations etc. is facilitated.

(Appended Mode 4)

In the three unit zoom lens according to at least one of appended modes 1 to 3, the front lens component and the rear lens component in the first lens unit may satisfy the following conditions:

$$-1.8 < f_{1F}/f_W < -1 \quad (7)$$

$$2 < f_{1R}/f_W < 9 \quad (8)$$

where $f_{1F}$ is the focal length of the front lens component in the first lens unit, $f_{1R}$ is the focal length of the rear lens component in the first lens unit, and $f_W$ is the focal length of the entire three unit zoom lens system at the wide angle end.

Conditional expressions (7) and (8) describe optimum relationship of the focal lengths of the lens components included in the first lens unit that ensures satisfactory performance while maintaining high productivity even if the zoom ratio is made as high as approximately four.

If the lower limit of conditional expression (7) is not exceeded, generation of high-order spherical aberration will be suppressed, whereby correction of spherical aberration is facilitated throughout the entire zoom range. In addition, the degree of asymmetry of the lens shape can be made small, which facilitates manufacturing of the lens.

If the upper limit of conditional expression (7) is not exceeded, variations of spherical aberration and curvature of field during zooming can easily be made small. This is advantageous in achieving good performance throughout the entire zoom range.

If the lower limit of conditional expression (8) is not exceeded so that the positive refracting power is made moderately small, suppression of positive curvature of field is facilitated.

If the upper limit of conditional expression (8) is not exceeded so that the positive refracting power is made moderately large, suppression of negative curvature of field is facilitated.

(Appended Mode 5)

In the three unit zoom lens according to at least one of appended modes 1 to 4, the object side surface of the front lens component in the first lens unit may be an aspheric surface having a negative refracting power that decreases away from the optical axis.

The effective diameter of the lens surface closest to the object side is larger at the wide angle end than at the telephoto end. Therefore, designing this lens surface to have the above described aspheric shape is advantageous not only in reducing high-order spherical aberration at zoom positions near the telephoto end but also in reducing coma etc. at zoom positions near the wide angle end.

(Appended Mode 6)

In the three unit zoom lens according to appended mode 5, the object side lens surface of the front lens component in the first lens unit may be an aspheric surface having a negative refracting power that decreases away from the optical axis and eventually becomes positive. This further facilitates correction of off-axis aberrations.

(Appended Mode 7)

In the three unit zoom lens according to appended mode 5 or 6, the front lens component in the first lens unit may have a biconcave shape, and the rear lens component in the first lens unit may have a meniscus shape that is convex toward the object side.

If these lens components have the above described shapes, a negative refracting power can be shared by both surfaces of the negative lens component, which is advantageous in reducing spherical aberration at zoom positions near the telephoto end. In addition, the angle of incidence of off-axis beams on the object side lens surface and the image side lens surface of the rear lens component in the first lens unit at zoom positions near the wide angle end can be made small, which is advantageous in reducing aberrations at zoom positions near the wide angle end.

(Appended Mode 8)

In the three unit zoom lens according to at least one of appended modes 5 to 7, the image side lens surface of the front lens component in the first lens unit may be an aspheric concave surface.

The effective diameter of the image side lens surface of the front lens component in the first lens unit is larger at the wide angle end than at the telephoto end, as with the lens surface closest to the object side. Therefore, the aspheric design of this lens surface facilitates, in cooperation with the aspheric surface on the object side, not only in reducing high-order spherical aberration at zoom positions near the telephoto end but also in reducing coma etc. at zoom positions near the wide angle end.

(Appended Mode 9)

In the three unit zoom lens according to at least one of appended modes 1 to 8, the aperture stop may be disposed just in front of the front lens component in the second lens unit.

This facilitates a further reduction in the size of the first lens unit. In addition, this also facilitates providing the image side lens surface of the second lens unit with a function of refracting beams in directions away from the optical axis. Furthermore this also facilitates a reduction in the angle of incidence of off-axis beams on the image plane. In addition, the degree of symmetry of the composite system of the first lens unit and the second lens unit with respect to the aperture stop at the telephoto end is further increased, which is advantageous in correcting aberrations such as chromatic aberration of magnification at zoom positions near the telephoto end.

INDUSTRIAL APPLICABILITY

As described in the foregoing, the three unit zoom lens according to the present invention is advantageous in achieving an adequate angle of field, an adequate zoom ratio, and good optical performance.

What is claimed is:

1. A three unit zoom lens comprising, in order from its object side:
    a first lens unit having a negative refracting power;
    a second lens unit having a positive refracting power; and
    a third lens unit having a positive refracting power, wherein
    during zooming from the wide angle end to the telephoto end, the second lens unit moves, the distance between the first lens unit and the second lens unit decreases, and the distance between the second lens unit and the third lens unit increases,
    when a lens component is defined as a lens member whose surfaces that are in contact with air on an optical axis include only two surfaces, one being an object side surface and the other being an image side surface,
    the second lens unit comprises, in order from the object side, a front lens component having an object side lens surface convex toward the object side and having a positive refracting power and a rear lens component having an image side lens surface concave toward the image side, the total number of lens components included in the second lens unit is two,
    the third lens unit comprises, in order from the object side, a front lens component having an object side lens surface concave toward the object side and a rear lens component having a image side lens surface convex toward the image side and having a positive refracting power, and the total number of lens components included in the third lens unit is two, and
    the three unit zoom lens comprises an aperture stop disposed closer to the image side than the first lens unit and closer to the object side than the rear lens component in the second lens unit, and the aperture stop moves integrally with the second lens unit along the optical axis direction during zooming from the wide angle end to the telephoto end.

2. The three unit zoom lens according to claim 1, wherein the second lens unit and the third lens unit satisfy the following conditions:

$$2 < (R_{2F} + R_{2R})/(R_{2F} - R_{2R}) < 20 \qquad (1)$$

$$1 < (R_{3F} + R_{3R})/(R_{3F} - R_{3R}) < 12 \qquad (2)$$

where, $R_{2F}$ is a paraxial radius of curvature of the lens surface closest to the object side in the second lens unit, $R_{2R}$ is a paraxial radius of curvature of the lens surface closest to the image side in the second lens unit, $R_{3F}$ is a paraxial radius of curvature of the lens surface closest to the object side in the third lens unit, and $R_{3R}$ is a paraxial radius of curvature of the lens surface closest to the image side in the third lens unit.

3. The three unit zoom lens according to claim 1, wherein an object side lens surface of the rear lens component in the second lens unit is convex toward the object side, and an image side lens surface of the front lens component in the third lens unit is convex toward the image side.

4. The three unit zoom lens according to claim 3, wherein the rear lens component in the second lens unit has a negative refracting power.

5. The three unit zoom lens according to claim 1, wherein the second lens unit and the third lens unit satisfy the following condition:

$$-0.9<(R_{2R}+R_{3F})/(R_{2R}-R_{3F})<0.0 \quad (A)$$

where, $R_{2R}$ is a paraxial radius of curvature of the lens surface closest to the image side in the second lens unit, and $R_{3F}$ is a paraxial radius of curvature of the lens surface closest to the object side in the third lens unit.

6. The three unit zoom lens according to claim 1, wherein
   the front lens component in the third lens unit has a meniscus shape,
   the absolute value of a paraxial radius of curvature of the image side lens surface of the rear lens component in the third lens unit is smaller than the absolute value of a paraxial radius of curvature of the object side lens surface thereof, and
   the three unit zoom lens satisfies the following conditions:

$$-15.0<(R_{3FR}+R_{3RF})/(R_{3FR}-R_{3RF})<0.0 \quad (B)$$

$$0.0<(R_{3RF}+R_{3R})/(R_{3RF}-R_{3R})<3.0 \quad (C)$$

where $R_{3FR}$ is a paraxial radius of curvature of an image side lens surface of the front lens component in the third lens unit, $R_{3RF}$ is a paraxial radius of curvature of an object side lens surface of the rear lens component in the third lens unit, and $R_{3R}$ is a paraxial radius of curvature of the lens surface closest to the image side in the third lens unit.

7. The three unit zoom lens according to claim 1, wherein the front lens component in the third lens unit has a meniscus shape that satisfies the following condition:

$$-0.5>f_{3FF}/f_{3FR}>-1.2 \quad (6)$$

where $f_{3FF}$ is the inverse of a refracting power of the object side lens surface of the front lens component in the third lens unit, and $f_{3FR}$ is the inverse of a refracting power of an image side lens surface of the front lens component in the third lens unit.

8. The three unit zoom lens according to claim 1, wherein the first lens unit comprises a negative lens component having an image side lens surface concave toward the image side and having a negative refracting power, and a positive lens component having a positive refracting power disposed on the image side of the negative lens component and having an object side lens surface convex toward the object side, and a paraxial radius of curvature of the object side lens surface of the positive lens component is larger than a paraxial radius of curvature of the image side lens surface of the negative lens component.

9. The three unit zoom lens according to claim 1, wherein the three unit zoom lens comprises the aperture stop disposed just in front of the front lens component in the second lens unit.

10. The three unit zoom lens according to claim 1, wherein the three unit zoom lens satisfies the following condition at the wide angle end:

$$1<D_{12}/f_W<4 \quad (4)$$

where $D_{12}$ is a distance, on the optical axis, from the lens surface closest to the image side in the first lens unit to the lens surface closest to the object side in the second lens unit at the wide angle end, and $f_W$ is a focal length of the entire three unit zoom lens system at the wide angle end.

11. The three unit zoom lens according to claim 1, wherein the second lens unit satisfies the following condition:

$$-0.7<T_{2F}/f_W<-0.4 \quad (5)$$

where $T_{2F}$ is a distance, on the optical axis, from the lens surface closest to the object side in the second lens unit to an anterior principal point of the second lens unit, wherein if the anterior principal point is located on the object side of the second lens unit, the distance $T_{2F}$ is represented by a negative value, and $f_W$ is a focal length of the entire three unit zoom lens system at the wide angle end.

12. The three unit zoom lens according to claim 1, wherein the three unit zoom lens satisfy the following condition:

$$6 \leq N_t \leq 8 \quad (9)$$

where $N_t$ is the total number of lens elements included in the three unit zoom lens.

13. The three unit zoom lens according to claim 1, wherein the first lens unit comprises a front lens component having a negative refracting power that is located closest to the object side, an object side surface and an image side surface of the front lens component both being aspheric.

14. The three unit zoom lens according to claim 1, wherein the number of lens elements included in the second lens unit is not more than three.

15. The three unit zoom lens according to claim 14, wherein the second lens unit comprises a single lens element having a positive refracting power, and a cemented lens component including a positive lens element and a negative lens element.

16. The three unit zoom lens according to claim 14, wherein the second lens unit comprises a single lens element having a positive refracting power and a single lens element having a negative refracting power.

17. The three unit zoom lens according to claim 1, wherein the second lens unit comprises a positive lens element and a negative lens element, and every negative lens element in the second lens unit has an Abbe number that is smaller than the Abbe number of any positive lens element in the second lens unit.

18. The three unit zoom lens according to claim 14, wherein the second lens unit satisfies the following conditions:

$$n_{2pave} \geq 1.59 \quad (10)$$

$$\nu_{2n} \leq 35 \quad (11)$$

where $n_{2pave}$ is an average of refractive indices of all the positive lens elements in the second lens unit, and $\nu_{2n}$ is an Abbe number of all the negative lens elements in the second lens unit.

19. The three unit zoom lens according to claim 1, wherein a lens element closest to the image side in the second lens unit is a negative lens element having a concave surface directed toward the image side, and a thickness of this negative lens element on the optical axis is larger than a distance, on the optical axis, between the front lens component and the rear lens component in the second lens unit.

20. The three unit zoom lens according to claim 1, wherein the second lens unit comprises a positive lens element having an aspheric surface.

21. The three unit zoom lens according to claim 1, wherein all the lens elements in the third lens unit satisfy the following conditions:

$$n_{3ave} \geq 1.4 \quad (12)$$

$$v_{3ave} > 50 \quad (13)$$

where $n_{3ave}$ is an average of refractive indices of all the lens elements in the third lens unit, and $v_{3ave}$ is an average of Abbe numbers of all the lens elements in the third lens unit.

22. The three unit zoom lens according to claim 1, wherein the total number of lens elements included in the third lens unit is two, and any one of them has an aspheric surface.

23. The three unit zoom lens according to claim 1, wherein the third lens unit includes at least one lens element that is made of a resin.

24. The three unit zoom lens according to claim 1, wherein the rear lens component in the second lens unit and the front lens component in the third lens unit both have a meniscus shape having a negative refracting power.

25. The three unit zoom lens according to claim 1, wherein during zooming from the wide angle end to the telephoto end, the first lens unit moves first toward the image side and thereafter reverses its moving direction to move toward the object side, and the third lens unit is located at a position closer to the image side at the telephoto end than its position at the wide angle end.

26. An image pickup apparatus including:
a three unit zoom lens as recited in claim 1; and
an image pickup element having an image pickup surface disposed on the image side of the three unit zoom lens that converts an image formed on the image pickup surface by the three unit zoom lens into an electrical signal.

27. An image pickup apparatus according to claim 26, further comprising a signal processing circuit that processes image data obtained through image pickup by the image pickup element and outputs processed image data representing a transformed image, and the three unit zoom lens satisfies the following condition at the wide angle end in a state in which the three unit zoom lens is focused on a farthest distance:

$$0.7 < y_{07}/(f_W \tan \omega_{07w}) < 1.0 \quad (14)$$

where $y_{07} = 0.7 \times y_{10}$, $y_{10}$ is a distance from a center of an effective image pick area of the image pickup element to a point farthest from the center within the effective image pickup area, wherein if the effective image pickup area changes during zooming from the wide angle end to the telephoto end, $y_{10}$ is the maximum value of the aforementioned distance, $\omega_{07w}$ is an angle formed by the optical axis and an incident ray in the object space of a principal ray that is incident on an image position at an image height of $y_{07}$ from the center of the image pickup surface at the wide angle end.

28. A three unit zoom lens comprising, in order from its object side:
a first lens unit having a negative refracting power;
a second lens unit having a positive refracting power; and
a third lens unit having a positive refracting power, wherein during zooming from the wide angle end to the telephoto end, the second lens unit moves, a distance between the first lens unit and the second lens unit decreases, and a distance between the second lens unit and the third lens unit increases,
when a lens component is defined as a lens member whose surfaces that are in contact with air on the optical axis include only two surfaces, one being an object side surface and the other being an image side surface,
the first lens unit comprises, in order from the object side, a front lens component having an object side lens surface concave toward the object side and having a negative refracting power and a rear lens component having a positive refracting power, the total number of lens components included in the first lens unit is two,
the second lens unit comprises, in order from the object side, a front lens component having a positive refracting power and a rear lens component having an image side lens surface concave toward the image side and having a negative refracting power, the total number of lens components included in the second lens unit is two,
and the third lens unit comprises two lens components including, in order from the object side a front lens component having an object side lens surface concave toward the object side and a rear lens component having a positive refracting power, and
the zoom lens comprises an aperture stop disposed closer to the image side than the first lens unit and closer to the object side than the rear lens component in the second lens unit, and the aperture stop moves integrally with the second lens unit along the optical axis direction during zooming from the wide angle end to the telephoto end.

29. The three unit zoom lens according to claim 28, wherein the second lens unit and the third lens unit satisfy the following condition:

$$0.1 < (R_{1F} + R_{2R})/(R_{1F} - R_{2R}) < 1.0 \quad (3)$$

where $R_{1F}$ is a paraxial radius of curvature of the lens surface closest to the object side in the first lens unit, and $R_{2R}$ is a paraxial radius of curvature of the lens surface closest to the image side in the second lens unit.

30. The three unit zoom lens according to claim 28, wherein the front lens component in the first lens unit is a biconcave lens component that satisfies the following condition:

$$-0.5 < (R_{1F} + R_{1FR})/(R_{1F} - R_{1FR}) < 1.0 \quad (D)$$

where $R_{1F}$ is a paraxial radius of curvature of the lens surface closest to the object side in the first lens unit, and $R_{1FR}$ is a paraxial radius of curvature of the image side lens surface of the front side lens component in the first lens unit.

31. The three unit zoom lens according to claim 28, wherein the front lens component and the rear lens component in the first lens unit satisfy the following condition:

$$-1.8 < f_{1F}/f_W < -1 \quad (7)$$

$$2 < f_{1R}/f_W < 9 \quad (8)$$

where $f_{1F}$ is a focal length of the front lens component in the first lens unit, $f_{1R}$ is a focal length of the rear lens component in the first lens unit, and $f_W$ is a focal length of the entire three unit zoom lens system at the wide angle end.

32. The three unit zoom lens according to claim 28, wherein the object side surface of the front lens component in the first lens unit is an aspheric surface having a negative refracting power that decreases away from the optical axis.

33. The three unit zoom lens according to claim 32, wherein the object side surface of the front lens component in the first lens unit is an aspheric surface having a negative refracting power that decreases away from the optical axis and eventually becomes positive.

34. The three unit zoom lens according to claim 32, wherein the front lens component in the first lens unit has a biconcave shape, and the rear lens component in the first lens unit has a meniscus shape that is convex toward the object side.

35. The three unit zoom lens according to claim 32, wherein the image side lens surface of the front lens component in the first lens unit is an aspheric concave surface.

36. The three unit zoom lens according to claim 28, wherein the aperture stop is disposed just in front of the front lens component in the second lens unit.

37. The three unit zoom lens according to claim 28, wherein the three unit zoom lens satisfies the following conditions at the wide angle end:

$$1 < D_{12}/f_W < 4 \quad (4)$$

where $D_{12}$ is a distance, on the optical axis, from the lens surface closest to the image side in the first lens unit to the lens surface closest to the object side in the second lens unit at the wide angle end, and $f_W$ is a focal length of the entire three unit zoom lens system at the wide angle end.

38. The three unit zoom lens according to claim 28, wherein the second lens unit satisfies the following condition:

$$-0.7 < T_{2F}/f_W < -0.4 \quad (5)$$

where $T_{2F}$ is a distance, on the optical axis, from the lens surface closest to the object side in the second lens unit to an anterior principal point of the second lens unit, wherein if the anterior principal point is located on the object side of the second lens unit, distance $T_{2F}$ is represented by a negative value, and $f_W$ is a focal length of the entire three unit zoom lens system at the wide angle end.

39. The three unit zoom lens according to claim 28, wherein the three unit zoom lens satisfies the following condition:

$$6 \leq N_t \leq 8 \quad (9)$$

where $N_t$ is the total number of lens elements included in the three unit zoom lens.

40. The three unit zoom lens according to claim 28, wherein the object side surface and image side surface of the front lens component in the first lens unit are both aspheric.

41. The three unit zoom lens according to claim 28, wherein the total number of lens elements included in the second lens unit is not more than three.

42. The three unit zoom lens according to claim 41, wherein the second lens unit comprises a single lens element having a positive refracting power, and a cemented lens component including a positive lens element and a negative lens element.

43. The three unit zoom lens according to claim 41, wherein the second lens unit comprises a single lens having a positive refracting power and a single lens having a negative refracting power.

44. The three unit zoom lens according to claim 28, wherein the second lens unit comprises a positive lens element(s) and a negative lens element (s), and every negative lens element in the second lens unit have an Abbe number that is smaller than an Abbe number of any positive lens element in the second lens unit.

45. The three unit zoom lens according to claim 31, wherein the second lens unit satisfies the following conditions:

$$n_{2pave} \geq 1.59 \quad (10)$$

$$\nu_{2n} \leq 35 \quad (11)$$

where $n_{2pave}$ is an average of refractive indices of all the positive lens elements in the second lens unit, and $\nu_{2n}$ is an Abbe number of all the negative lens elements in the second lens unit.

46. The three unit zoom lens according to claim 28, wherein a lens element closest to the image side in the second lens unit is a negative lens element having a concave surface directed toward the image side, and a thickness of this negative lens element on the optical axis is larger than a distance, on the optical axis, between the front lens component and the rear lens component in the second lens unit.

47. The three unit zoom lens according to claim 28, wherein the second lens unit comprises a positive lens element having an aspheric surface.

48. The three unit zoom lens according to claim 28, wherein all the lens elements in the third lens unit satisfy the following conditions:

$$n_{3ave} \geq 1.4 \quad (12)$$

$$\nu_{3ave} \geq 50 \quad (13)$$

where $n_{3ave}$ is an average of refractive indices of all the lens elements in the third lens unit, and $\nu_{3ave}$ is an average of Abbe numbers of all the lens elements in the third lens unit.

49. The three unit zoom lens according to claim 28, wherein the total number of lens elements included in the third lens unit is two, and any one of them has an aspheric surface.

50. The three unit zoom lens according to claim 28, wherein the third lens unit includes at least one lens element that is made of a resin.

51. The three unit zoom lens according to claim 28, wherein the rear lens component in the second lens unit and the front lens component in the third lens unit both have a meniscus shape having a negative refracting power.

52. The three unit zoom lens according to claim 28, wherein during zooming from the wide angle end to the telephoto end, the first lens unit moves first toward the image side and thereafter reverses its moving direction to move toward the object side, and the third lens unit is located at a position closer to the image side at the telephoto end than its position at the wide angle end.

53. An image pickup apparatus including:
a three unit zoom lens as recited in claim 28; and
an image pickup element having an image pickup surface disposed on the image side of the three unit zoom lens that converts an image formed on the image pickup surface by the three unit zoom lens into an electrical signal.

54. An image pickup apparatus according to claim 53, further comprising a signal processing circuit that processes image data obtained through image pickup by the image pickup element and outputs processed image data representing a transformed image, and the three unit zoom lens satisfies the following condition at the wide angle end in a state in which the three unit zoom lens is focused on a farthest distance:

$$0.7 < y_{07}/(f_W \tan \omega_{07w}) < 1.0 \quad (14)$$

where $y_{07}=0.7 \times y_{10}$, $y_{10}$ is a distance from a center of an effective image pick area of the image pickup element to a point farthest from the center within the effective image pickup area, wherein if the effective image pickup area changes during zooming from the wide angle end to the telephoto end, $y_{10}$ is the maximum value of the aforementioned distance, $\omega_{07w}$ is an angle formed by the optical axis and an incident ray in the object space of a principal ray that is incident on an image position at an image height of $y_{07}$ from the center of the image pickup surface at the wide angle end.

* * * * *